US012569391B2

(12) United States Patent
Yoo

(10) Patent No.: US 12,569,391 B2
(45) Date of Patent: Mar. 10, 2026

(54) MULTI-FUNCTION STRETCHING APPARATUS

(71) Applicant: DRAX INC., Anyang-si (KR)

(72) Inventor: Seon Kyung Yoo, Seoul (KR)

(73) Assignee: DRAX INC., Anyang-si (KR)

( * ) Notice: Subject to any disclaimer, the term of this patent is extended or adjusted under 35 U.S.C. 154(b) by 46 days.

(21) Appl. No.: 18/585,839

(22) Filed: Feb. 23, 2024

(65) Prior Publication Data

US 2024/0285458 A1 Aug. 29, 2024

(30) Foreign Application Priority Data

Feb. 27, 2023 (KR) ........................ 10-2023-0026113

(51) Int. Cl.
*A61H 1/02* (2006.01)
*A63B 23/00* (2006.01)

(52) U.S. Cl.
CPC ............... *A61H 1/02* (2013.01); *A63B 23/00* (2013.01); *A61H 2201/0192* (2013.01); *A63B 2023/006* (2013.01); *A63B 2225/093* (2013.01)

(58) Field of Classification Search
CPC .............. A61H 1/02; A61H 2201/0192; A61H 2201/1261; A61H 2201/1284; A61H 2201/1635; A61H 2201/164; A61H 2201/1664; A61H 2201/5043; A61H 2201/5097; A61H 1/0237; A61H 1/0274; A61H 1/0292; A63B 23/00; A63B 2023/006; A63B 2225/093; A63B 21/4027; A63B 21/4035; A63B 21/4045; A63B 71/0622; A63B 2225/09
See application file for complete search history.

(56) References Cited

U.S. PATENT DOCUMENTS 3,675,646 A * 7/1972 Corcoran ............. A61G 15/007 D24/188
3,768,464 A * 10/1973 Greissing ............. A61H 1/0218 602/32
4,688,557 A * 8/1987 Bradstreet ............ A61H 1/0218 606/241
5,529,560 A * 6/1996 Davies, III ........... A61H 1/0244 601/24
(Continued)

FOREIGN PATENT DOCUMENTS

WO 2007/069801 A1 6/2007

OTHER PUBLICATIONS

Extended European Search Report dated Jul. 8, 2024 from the European Patent Office in Application No. 24160028.7.

*Primary Examiner* — Garrett K Atkinson
(74) *Attorney, Agent, or Firm* — Sughrue Mion, PLLC

(57) ABSTRACT

A multi-function stretching apparatus according to an embodiment includes a body frame, a first stretching member provided in the body frame to be slidable in a front-back direction, a second stretching member provided in the body frame to be angle-adjustable, and a third stretching member provided in the body frame to be height-adjustable, wherein the first stretching member, the second stretching member, and the third stretching member are arranged in the body frame such that movement paths of the first stretching member, the second stretching member, and the third stretching member do not interfere with each other.

12 Claims, 24 Drawing Sheets

(56) References Cited

U.S. PATENT DOCUMENTS

| | | | | | |
|---|---|---|---|---|---|
| 5,637,079 | A * | 6/1997 | Miller | A61H 1/0218 | 606/241 |
| 5,997,450 | A * | 12/1999 | Wilkinson | A63B 23/0211 | 601/24 |
| 6,835,170 | B2 * | 12/2004 | Ogle | A61H 1/0292 | 482/145 |
| 7,087,005 | B2 * | 8/2006 | Rouillard | A63B 23/0233 | 482/142 |
| 7,648,473 | B1 * | 1/2010 | Peruvingal | A61F 5/3776 | 601/24 |
| 8,556,787 | B2 * | 10/2013 | Leier | A61H 1/0222 | 482/144 |
| 9,974,999 | B2 * | 5/2018 | Land | A63B 21/00047 | |
| 10,035,039 | B1 * | 7/2018 | Jui | A63B 23/1218 | |
| 10,500,119 | B2 * | 12/2019 | Berg | A63B 23/1209 | |
| 10,517,787 | B1 * | 12/2019 | Hyams | A61H 1/0237 | |
| 11,040,240 | B1 * | 6/2021 | Powers | A63B 21/4039 | |
| 2001/0034289 | A1 * | 10/2001 | Parrillo | A63B 23/035 | 482/94 |
| 2005/0054499 | A1 * | 3/2005 | Davies, III | A61H 1/0229 | 482/131 |
| 2007/0225136 | A1 * | 9/2007 | Roman | A63B 21/068 | 482/142 |
| 2010/0160127 | A1 * | 6/2010 | Bracci | A61H 1/0292 | 482/143 |
| 2010/0234192 | A1 * | 9/2010 | Oller, Jr. | A63B 21/4047 | 482/131 |
| 2013/0029812 | A1 * | 1/2013 | Teeter | A61H 1/0292 | 482/126 |
| 2013/0197403 | A1 * | 8/2013 | Sevy | A63B 23/0494 | 601/5 |
| 2016/0324712 | A1 * | 11/2016 | Carlin | A61H 1/0229 | |
| 2016/0331622 | A1 * | 11/2016 | Haene | A61H 1/0229 | |
| 2017/0065477 | A1 * | 3/2017 | Jagger | A61N 5/0613 | |
| 2017/0266077 | A1 * | 9/2017 | Mackin | A61G 13/1235 | |
| 2020/0376322 | A1 * | 12/2020 | Alvarez | A63B 21/4034 | |
| 2022/0096307 | A1 * | 3/2022 | Doran | A61H 1/0266 | |
| 2022/0241129 | A1 * | 8/2022 | Berg | A63B 23/1209 | |
| 2024/0277549 | A1 * | 8/2024 | Sawyers | A61H 1/0281 | |

* cited by examiner

MULTI-FUNCTION STRETCHING APPARATUS

CROSS-REFERENCE TO RELATED APPLICATION

This application is based on and claims priority under 35 U.S.C. § 119 to Korean Patent Application No. 10-2023-0026113, filed on Feb. 27, 2023, in the Korean Intellectual Property Office, the disclosure of which is incorporated by reference herein in its entirety.

BACKGROUND

1. Field

The present disclosure relates to a multi-function stretching apparatus for performing various stretching exercises.

2. Description of the Related Art

Joints of the human body have a normal range of motion. However, due to lack of exercise, injury, or aging, the range of motion of joints may decrease. When the range of motion of joints is reduced, the risk of joint injury may increase and motion functions may decrease.

In order to prevent the range of motion of joints from decreasing, stretching or stretching motions may be performed. Stretching motions are exercises that stretch the muscles, joints, or ligaments of the body. Through the stretching motions, the range of motion of the joints may be increased or the flexibility of the body may be maintained or increased.

A stretching apparatus may be used for assisting during such stretching motions. However, it is known that the human body has more than 300 joints. Stretching motions to increase the range of motion of the human body's joints are also diverse, and stretching apparatuses for the stretching motions may also be diverse.

However, when a plurality of stretching apparatuses are individually provided for each of the various stretching motions, space utilization may be reduced.

SUMMARY

An embodiment of the present disclosure provides a multi-function stretching apparatus having a compact size, and accordingly, the space utilization of exercise spaces in sports centers or gyms may be increased.

Another embodiment of the present disclosure provides a multi-function stretching apparatus by which various stretching motions may be made with a single device, and accordingly, the space utilization of exercise spaces in sports centers or gyms may be increased.

Additional aspects will be set forth in part in the description which follows and, in part, will be apparent from the description, or may be learned by practice of the presented embodiments of the disclosure.

According to an aspect of the present disclosure, a multi-function stretching apparatus includes a body frame, a first stretching member provided in the body frame to be slidable in a front-back direction, a second stretching member provided in the body frame to be angle-adjustable, and a third stretching member provided in the body frame to be height-adjustable, wherein the first stretching member, the second stretching member, and the third stretching member are arranged in the body frame such that movement paths of the first stretching member, the second stretching member, and the third stretching member do not interfere with each other.

A first movement path when the first stretching member is moved in the front-back direction may be separated from a second movement path when the second stretching member is angle-adjusted.

The first stretching member may be provided on the body frame to slide along the first movement path between a foremost position and a rearmost position, and the second stretching member may be at a same height as the first stretching member and arranged on a front side of the foremost position of the first stretching member.

The first stretching member may include a 1st-1 stretching member provided on the body frame to be slidable in the front-back direction and a 1st-2 stretching member that is arranged above the 1st-1 stretching member to be separated from the 1st-1 stretching member and is slidable in the front-back direction, and the second stretching member may be at a same height as the 1st-1 stretching member and may be arranged on a front side of the 1st-1 stretching member.

A first movement path when the first stretching member is moved in the front-back direction may be separated from a third movement path when the third stretching member is height-adjusted.

The first stretching member may be arranged on the body frame to slide along the first movement path between a foremost position and a rearmost position, and the third stretching member may be above the first stretching member to be separated from the first stretching member and to overlap the first stretching member in a vertical direction when the first stretching member is in the rearmost position.

The body frame may include a plurality of support frames including a pair of first support frames having a first height and a pair of second support frames having a second height greater than the first height and arranged at rear of the pair of first support frames to be separated from the pair of first support frames, and a plurality of horizontal frames arranged between one of the pair of first support frames and one of the pair of second support frames and each having both end portions supported by one of the pair of first support frames and one of the pair of second support frames.

The plurality of horizontal frames may include a pair of first horizontal frames extending in the front-to-back direction, and a pair of second horizontal frames extending in the front-back direction and arranged above the pair of first horizontal frames to be separated from the pair of first horizontal frames.

A movement distance of the 1st-1 stretching member in the front-back direction may be less than a length of each of the pair of first horizontal frames.

The body frame may further include a plurality of connection frames configured to maintain an interval between the plurality of horizontal frames or the plurality of support frames.

The plurality of connection frames may include a first connection frame between the pair of first horizontal frames, and a second connection frame between the pair of second support frames.

The second stretching member may be arranged on the body frame to rotate about a preset rotation axis, and the first connection frame may be arranged on a same axis as the preset rotation axis of the second stretching member.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 21 is a view illustrating a stretching motion using a second stretching member of a multi-function stretching device according to an embodiment;

DETAILED DESCRIPTION

Figure 1:
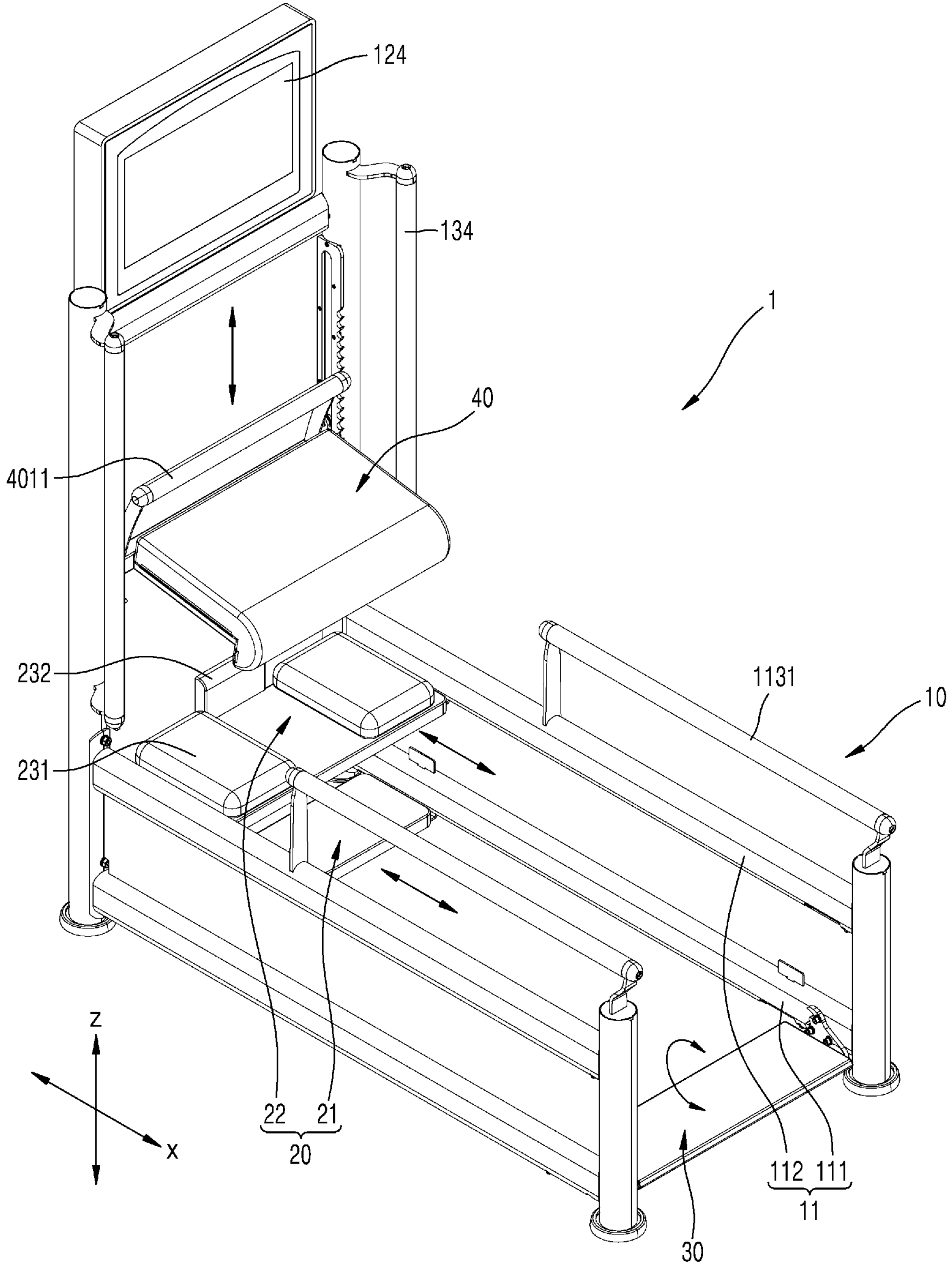
FIG. 1 is a perspective view illustrating an example of a multi-function stretching apparatus according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, several embodiments of the present disclosure will be described in detail with reference to the attached drawings such that those skilled in the art in which the present disclosure belongs easily practice the present disclosure.

Figure 2:
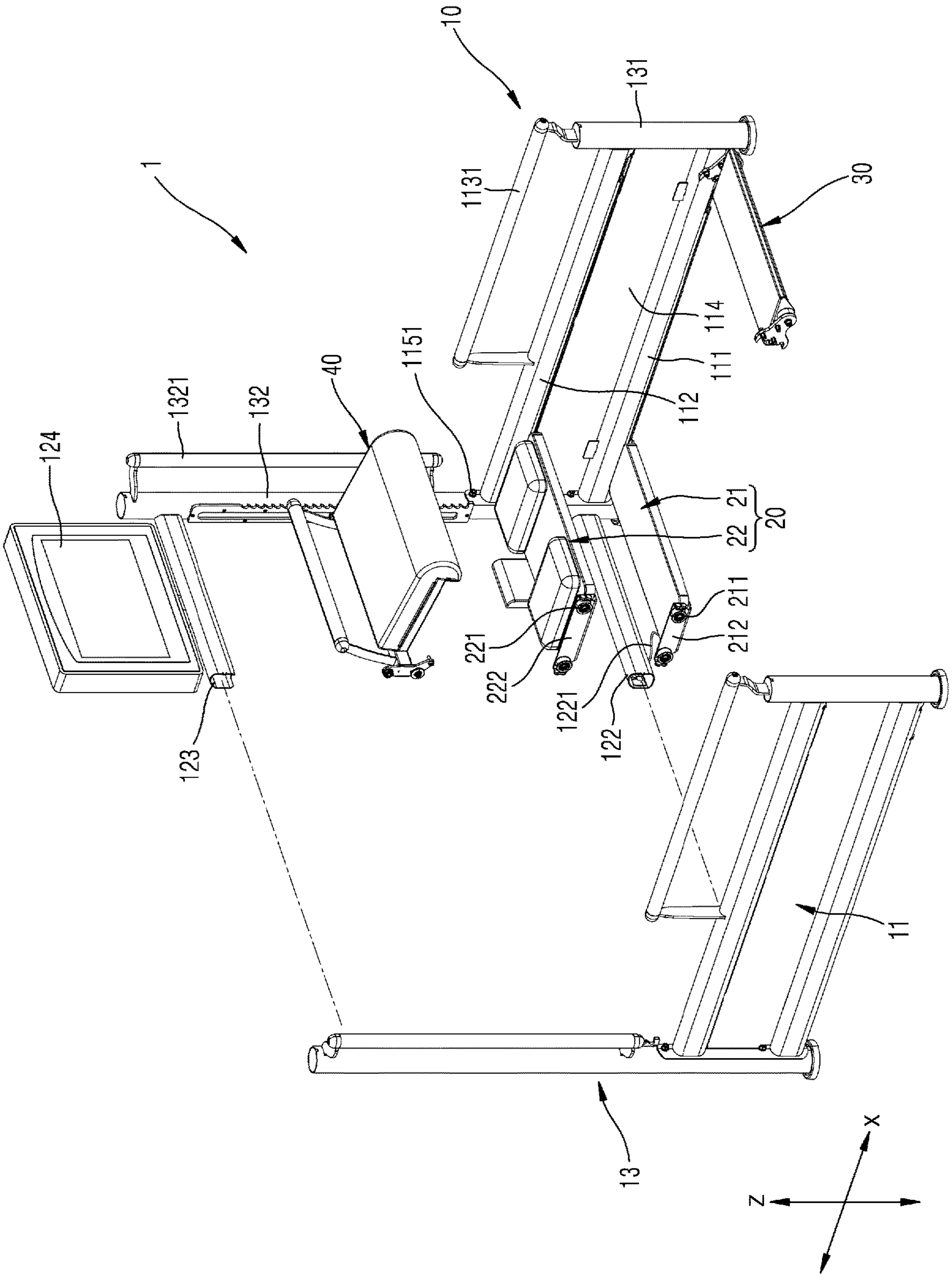
FIG. 2 is an exploded perspective view of the multi-function stretching apparatus of FIG. 1.
Figure 3:
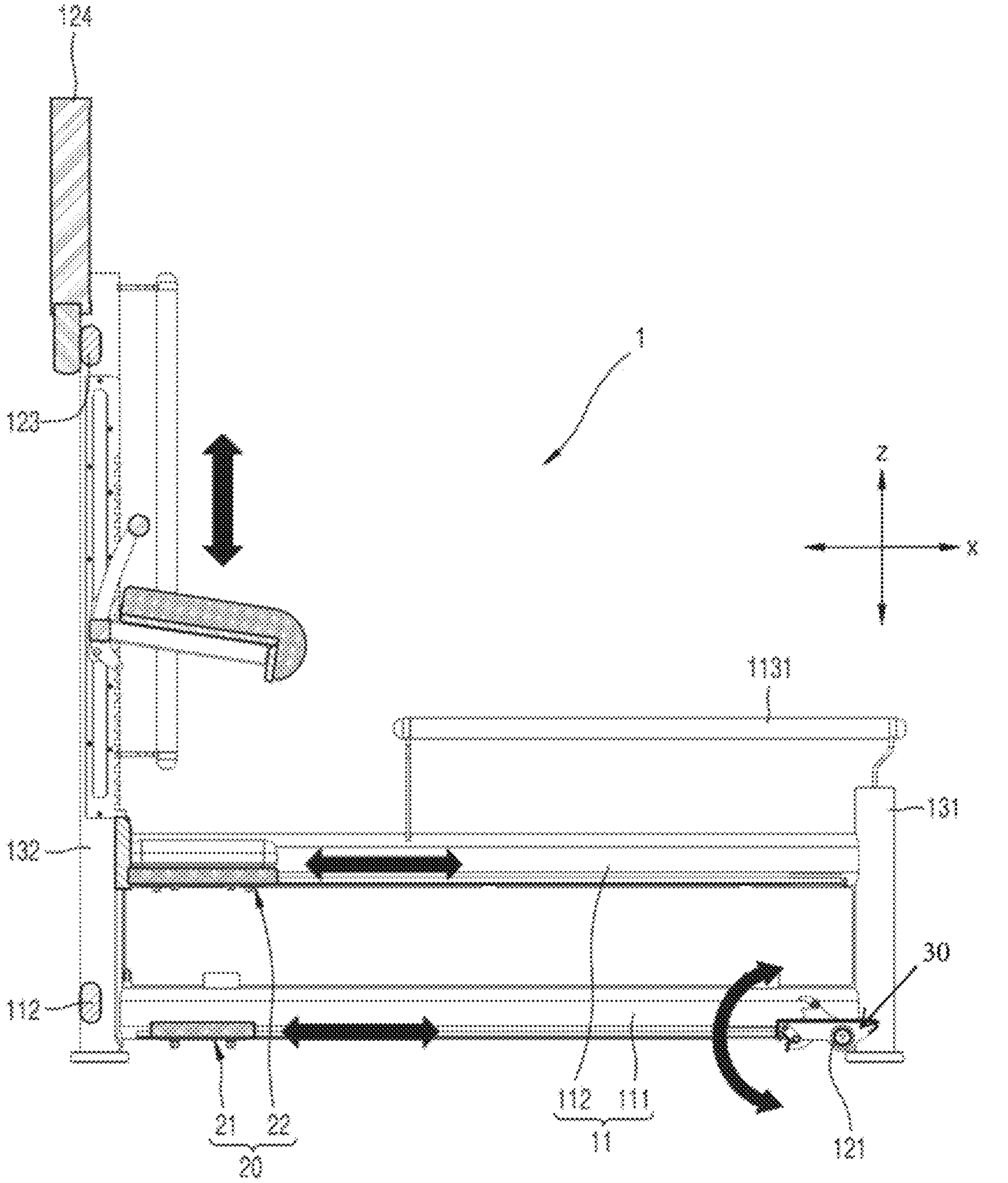
FIG. 3 is a cross-sectional view of the multi-function stretching apparatus of FIG. 1.

FIG. 1 is a perspective view illustrating an example of a multi-function stretching apparatus 1 according to an embodiment of the present disclosure. FIG. 2 is an exploded perspective view of the multi-function stretching apparatus 1 of FIG. 1. FIG. 3 is a cross-sectional view of the multi-function stretching apparatus 1 of FIG. 1.

Referring to FIG. 1, the multi-function stretching apparatus 1 according to an embodiment may include a body frame 10 and a plurality of stretching members installed on the body frame 10.

The plurality of stretching members may include a first stretching member 20, a second stretching member 30, and a third stretching member 40, which have different operating characteristics.

The first stretching member 20 may be provided in the body frame 10 to slide in a front-back direction X. The first stretching member 20 may be supported on the body frame 10 to be movable in the front-back direction X.

The first stretching member 20 may have a first movement path when moving in the front-back direction X. The first movement path may be a straight path extending in the front-back direction X. The first stretching member 20 moves in the front-rear direction X and has a foremost position and a rearmost position. The first stretching member 20 may be arranged on the body frame 10 to slide between the foremost position and the rearmost position along the first movement path.

The first stretching member 20 may include a plurality of stretching members. For example, the first stretching member 20 may include a 1st-1 stretching member 21 and a 1 st-2 stretching member 22, which are arranged in parallel to each other.

The 1st-1 stretching member 21 may be provided on the body frame 10 along the front-back direction X to be slidable. The 1st-2 stretching member 22 may be above the 1st-1 stretching member 21 to be separated from the 1st-1 stretching member 21 and to be slidable in the front-back direction X.

The second stretching member 30 may be provided in the body frame 10 to be angle-adjustable. For example, the second stretching member 30 may be provided in the body frame 10 to be rotatable about a preset rotation axis 301.

The second stretching member 30 may have a second movement path when an angle is adjusted. The second movement path may be a path through which a rear end of the second stretching member 30 passes when the second stretching member 30 rotates about a rotation axis 301.

The third stretching member 40 may be provided in the body frame 10 to be height-adjustable. The third stretching member 40 may be provided in the body frame 10 to be position-adjustable in a vertical direction Z.

The third stretching member 40 may have a third movement path through which the third stretching member 40 moves when the of the third movement is adjusted. The third movement path may be the longest path through which the third stretching member 40 may move in the vertical direction Z.

In the multi-function stretching apparatus 1 according to an embodiment, the first stretching member 20, the second stretching member 30, and the third stretching member 40 may be arranged in the body frame 10 such that the respective movement paths do not interfere with each other. As described above, a plurality of stretching members capable of performing various stretching motions are arranged in one apparatus, and thus, the space efficiency of exercise spaces in a sports centers or a gymnasium may be increased.

Referring to FIGS. 1 to 3, the multi-function stretching apparatus 1 according to the embodiment may include the first stretching member 20, the second stretching member 30, and the third stretching member 40 installed in the body frame 10 such that movement paths of the first, second, and third stretching members 20, 30, and 40 do not interfere with each other.

The first movement path through which the first stretching member 20 moves in the front-back direction X may be separated from the second movement path when an angle of the second stretching member 30 is adjusted. For example, the second stretching member 30 may be at the same height as the first stretching member 20 and be on a further front side than a foremost position of the first stretching member 20. That is, the second stretching member 30 may overlap the first stretching member 20 in the front-to-back direction X and may be on a further front side than a foremost position of the first stretching member 20. For example, the second stretching member 30 may be at the same height as the 1st-1 stretching member 21 and be on a further front side than the 1st-1 stretching member 21. That is, the second stretching member 30 may overlap the 1st-1 stretching member 21 in the front-to-back direction X and may be on a front side of the 1st-1 stretching member 21. Here, being at the same height may mean that at least a part of the second stretching member 30 overlaps the 1st-1 stretching member 21 in the front-back direction X.

The first movement path of the first stretching member 20 may be separated from the third movement path of the third stretching member 40. For example, the third stretching member 40 may overlap the first stretching member 20 in the vertical direction Z when the first stretching member 20 is in a rearmost position and may be above the first stretching member 20 to be separated from the first stretching member 20. For example, the third stretching member 40 may overlap the 1st-2 stretching member 22 in the vertical direction Z when the 1st-2 stretching member 22 is in a rearmost position and may be above the 1st-2 stretching member 22 to be separated from the 1st-2 stretching member 22.

The body frame 10 according to the embodiment includes a plurality of support frames 13 and a plurality of horizontal frames 11 supported by the plurality of support frames 13. The body frame 10 may have a structure in which the plurality of support frames 13 are separately assembled with the plurality of horizontal frames 11, but the present disclosure is not limited thereto, and the plurality of support frames 13 may be respectively integrated with the plurality of support frames 13.

One end portion of each of the plurality of support frames 13 may be supported by a bottom surface and may extend in the vertical direction Z. A cross-sectional shape of each of the plurality of support frames 13 may be circular. However, the cross-sectional shape of each of the plurality of support frames 13 is not limited thereto and may be polygonal or oval.

The plurality of support frames 13 may include a pair of first support frames 131 and a pair of second support frames 132 separated from the pair of first support frames 131 at the rear of the pair of first support frames 131.

The pair of first support frames 131 may be parallel to each other on a front side of the multi-function stretching apparatus 1. Each of the pair of first support frames 131 may have a first height.

The pair of second support frames 132 may be parallel to each other on a rear side of the multi-function stretching apparatus 1. Each of the pair of second support frames 132 may have a second height. The second height may be greater than the first height. For example, the second height may be 1.5 times or more than the first height. For example, the second height may be two to three times the first height. The pair of second support frames 132 may include a first handle 1321 extending in the vertical direction Z.

The plurality of horizontal frames 11 may include a pair of first horizontal frames 111 and a pair of second horizontal frames 112. The pair of first horizontal frames 111 may be parallel to each other in the front-back direction X, and the pair of second horizontal frames 112 may be parallel to each other in the front-back direction X. The plurality of horizontal frames 11 may include a second handle 1131 extending in the front-back direction X.

The first horizontal frame 111 may be parallel to the second horizontal frame 112 in the vertical direction Z. An extension length of the first horizontal frame 111 may be equal to an extension length of the second horizontal frame 112. The second horizontal frame 112 may be above the first horizontal frame 111 to be separated from the first horizontal frame 111. A decoration plate 114 may be between the first horizontal frame 111 and the second horizontal frame 112. A material of the decoration plate 114 may be wood but is not limited thereto and may change. For example, the material of the decoration plate 114 may be plastic or metal.

The first horizontal frame 111 and the second horizontal frame 112 may be between the first support frame 131 and the second support frame 132. One end portion of the first horizontal frame 111 may be supported by the first support frame 131, and the other end portion of the first horizontal frame 111 may be supported by the second support frame 132. One end portion of the second horizontal frame 112 may be supported by the first support frame 131, and the other end portion of the second horizontal frame 112 may be supported by the second support frame 132.

Each of the first horizontal frame 111 and the second horizontal frame 112 may be supported by the first support frame 131 and the second support frame 132. For example, one end portion of the first horizontal frame 111 and one end portion of the second horizontal frame 112 may be directly fixed to the first support frame 131. The other end portion of the first horizontal frame 111 and the other end portion of the second horizontal frame 112 may be fixed to the second support frame 132 by a support plate 1151. However, the structure, in which each of the first horizontal frame 111 and the second horizontal frame 112 is supported by the first support frame 131 and the second support frame 132, is not limited thereto and may change.

A horizontal interval between the plurality of horizontal frames 11 or between the plurality of support frames 13 may be maintained by a connection frame 12. For example, the connection frame 12 may include a first connection frame 121, a second connection frame 122, and a third connection frame 123. The body frame 10 may have a structure in which the plurality of horizontal frames 11, the plurality of support frames 13, and the plurality of connection frames 12 are separately assembled with each other, but the present disclosure is not limited thereto, and the plurality of horizontal frames 11, the plurality of support frames 13, and the plurality of connection frames 12 may be respectively integrated with each other.

The first connection frame 121 may be between the pair of first horizontal frames 111. For example, the first connection frame 121 may be on a front side between the pair of first horizontal frames 111.

The second connection frame 122 may be between the pair of second support frames 132. For example, the second connection frame 122 may be on a lower side between the pair of second support frames 132. An elastic member 1221 may be between the second connection frame 122 and the 1st-1 stretching member 21 such that the elastic member 1221 provides elastic force in a direction in which the 1st-1 stretching member 21 approaches the second connection frame 122.

The third connection frame 123 may be between the pair of second support frames 132. For example, the third connection frame 123 may be on an upper side between the pair of second support frames 132. A display panel 124 may be on the third connection frame 123.

Referring to FIGS. 1 and 3, in the multi-function stretching device 1 according to the embodiment, the first stretching member 20 may be between the plurality of horizontal frames 11.

For example, the 1st-1 stretching member 21 may be between the pair of first horizontal frames 111. The 1st-1 stretching member 21 may move in an extension direction of the first horizontal frame 111. The 1st-1 stretching member 21 may move in the front-back direction X.

The 1st-2 stretching member 22 may be above the 1st-1 stretching member 21 to be separated from the 1st-1 stretching member 21. When a user performs a stretching motion by using the 1st-1 stretching member 21, the 1st-1 stretching member 21 and the 1 st-2 stretching member 22 may have a preset gap therebetween in the vertical direction Z such that the 1st-1 stretching member 21 does not collide with the 1st-2 stretching member 22. For example, the interval in the vertical direction Z between the 1st-1 stretching member 21 and the 1st-2 stretching member 22 may be about 15 cm to about 45 cm.

The 1st-2 stretching member 22 may be between the pair of second horizontal frames 112. The 1st-2 stretching member 22 may move in an extension direction of the second horizontal frame 112. The 1st-2 stretching member 22 may move in the front-back direction X. A movable distance of the 1st-2 stretching member 22 is longer than a movable distance of the 1st-1 stretching member 21.

The 1st-2 stretching member 22 may include a pair of pads 231. The pair of pads 231 may be separated from each other in a horizontal direction on the 1st-2 stretching member 22.

The 1st-2 stretching member 22 may include a foot support 232 provided to support a user's foot. A user may slidingly move the 1st-2 stretching member 22 in the front-back direction X while supporting a foot on the foot support 232.

The 1st-1 stretching member 21 and the 1st-2 stretching member 22 may be supported on the body frame 10 to be slidable in the front-back direction X. For example, the 1st-1 stretching member 21 may be supported by the pair of first horizontal frames 111 to be movable in the front-back direction X. For example, the 1st-2 stretching member 22 may be supported by the pair of second horizontal frames 112 to be movable in the front-back direction X.

Figure 4:
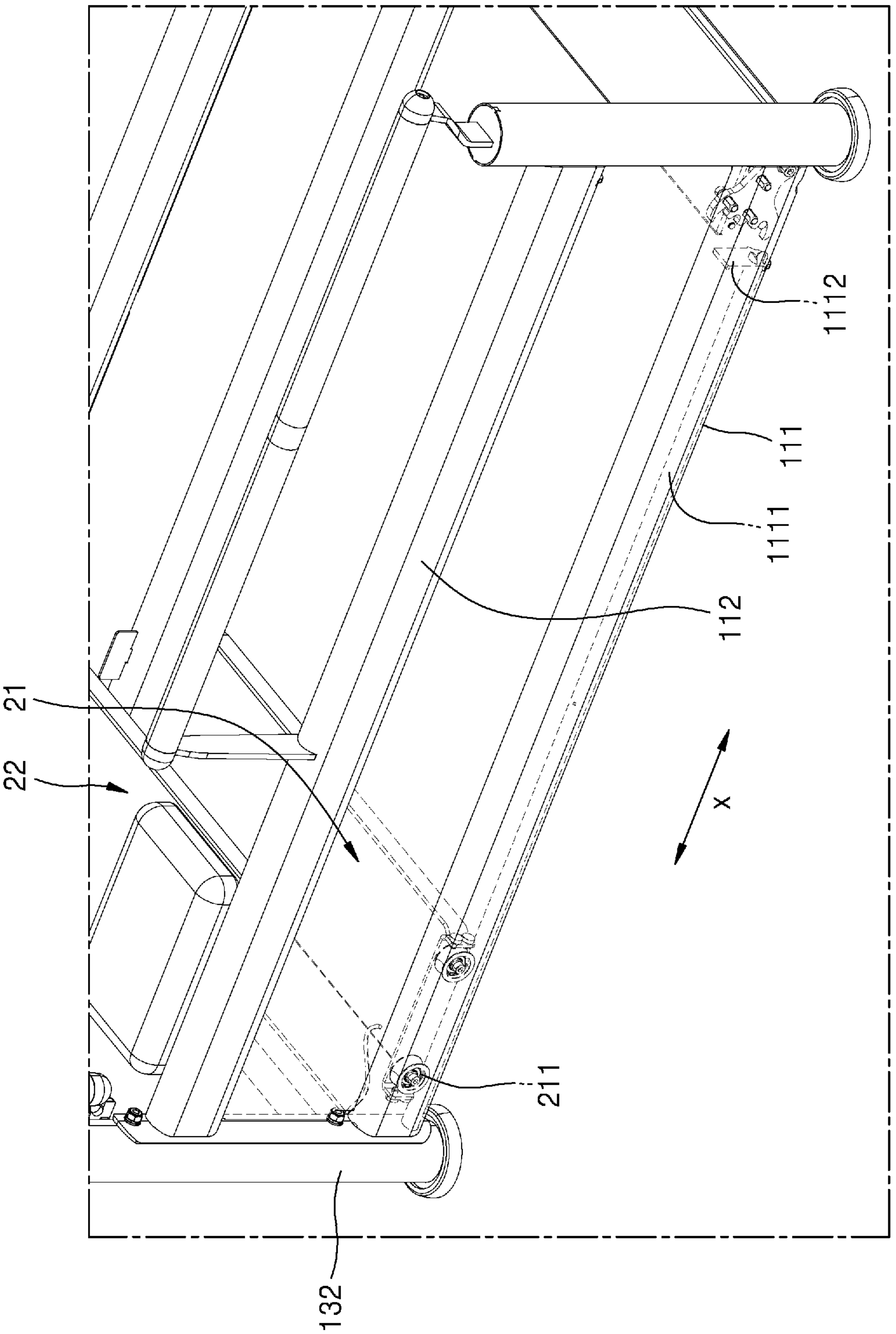
FIG. 4 is an enlarged perspective view of a 1st-1 stretching member, a 1st-2 stretching member, and a peripheral part thereof in the multi-function stretching apparatus according to the embodiment.
Figure 5:
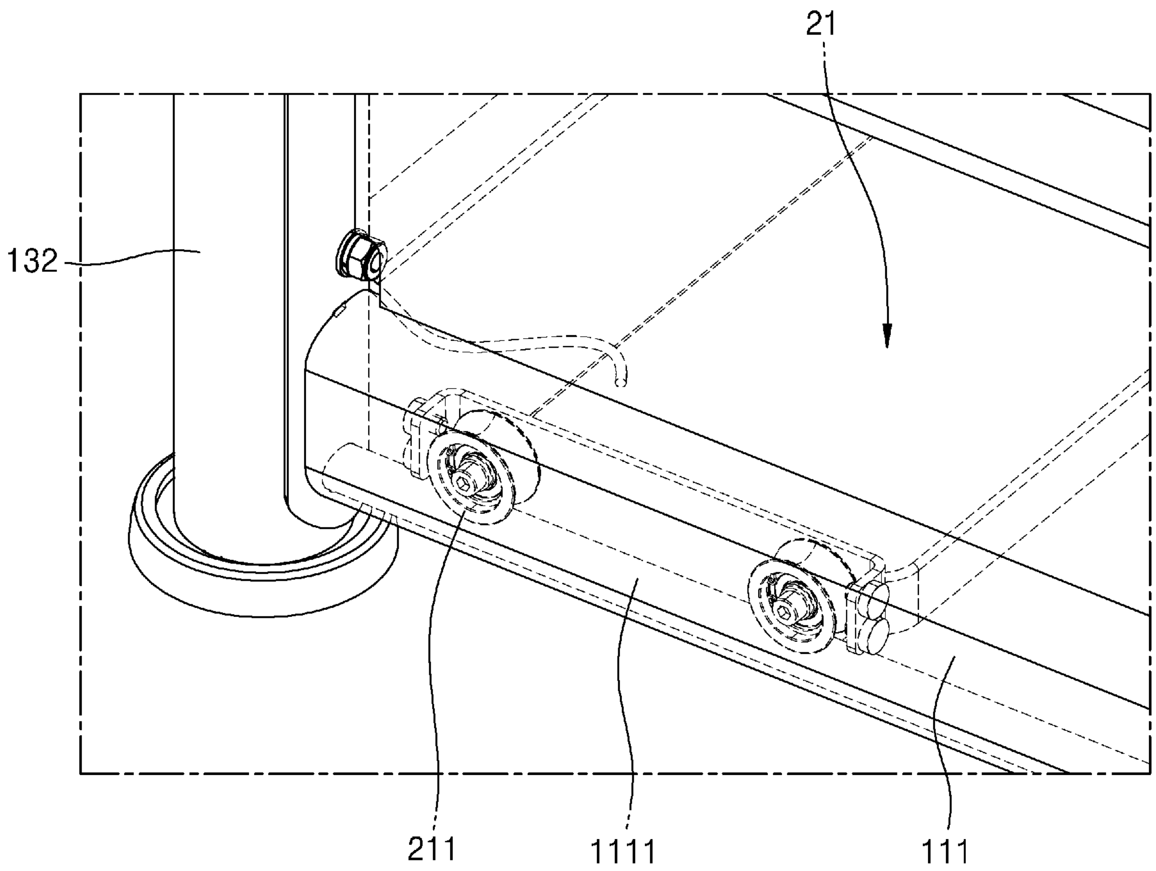
FIG. 5 is an enlarged view of a part of the multi-function stretching apparatus of FIG. 4.

FIG. 4 is an enlarged perspective view of the 1st-1 stretching member 21, the 1st-2 stretching member 22, and a peripheral portion thereof in the multi-function stretching apparatus 1 according to the embodiment. FIG. 5 is an enlarged view of a part of the multi-function stretching apparatus 1 of FIG. 4, and FIG. 6 is an enlarged view of another part of the multi-function stretching apparatus 1 of FIG. 4.

Figure 6:
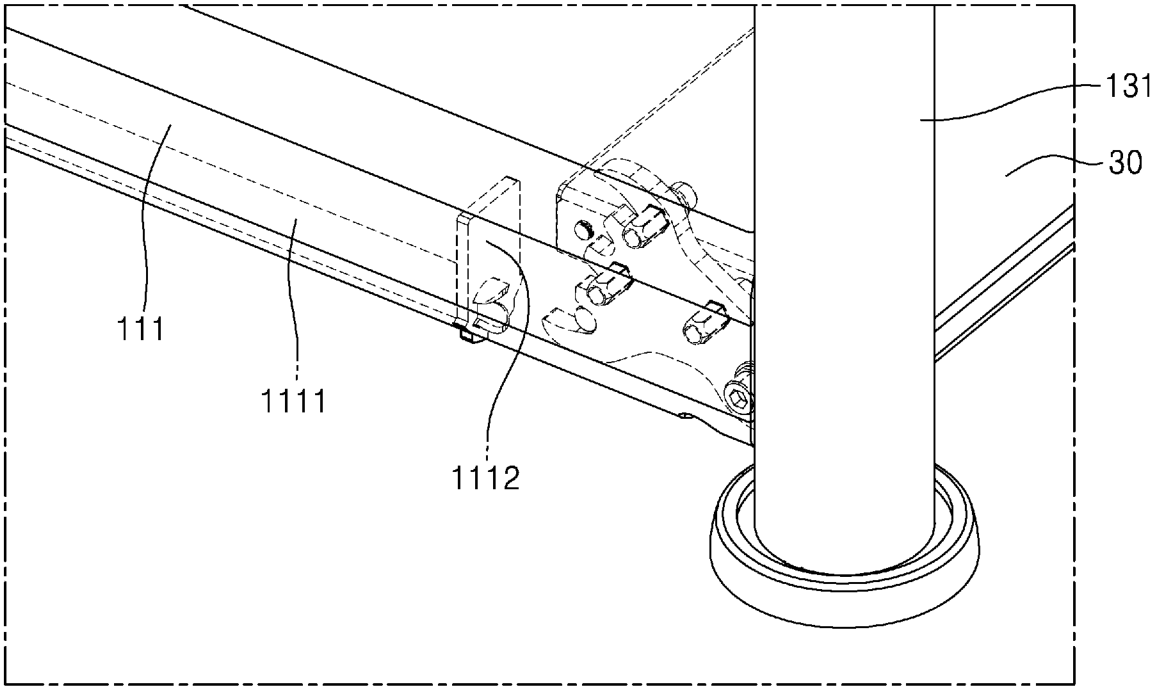
FIG. 6 is an enlarged view of another part of the multi-function stretching apparatus of FIG. 4.

Referring to FIGS. 4 to 6, a first guide rail 1111 may be on the first horizontal frame 111 to guide the movement of the 1st-1 stretching member 21 in the front-back direction X. The first guide rail 1111 may extend in the front-back direction X. One end portion of the first guide rail 1111 may be supported by the second support frame 132, and the other end portion of the first guide rail 1111 may be supported by a first stopper 1112 provided on the first horizontal frame 111.

Both end portions of the 1st-1 stretching member 21 in the horizontal direction may include a first guide wheels 211 provided to move along the first guide rail 1111. The first guide wheel 211 of the first stretching member 20 may be inside the first horizontal frame 111 and may move along the first guide rail 1111 in the front-back direction X. A front movement distance of the 1st-1 stretching member 21 may be limited by the first stopper 1112. Accordingly, a movement distance of the 1st-1 stretching member 21 in the front-back direction X may be less than a length of the first horizontal frame 111.

Figure 7:
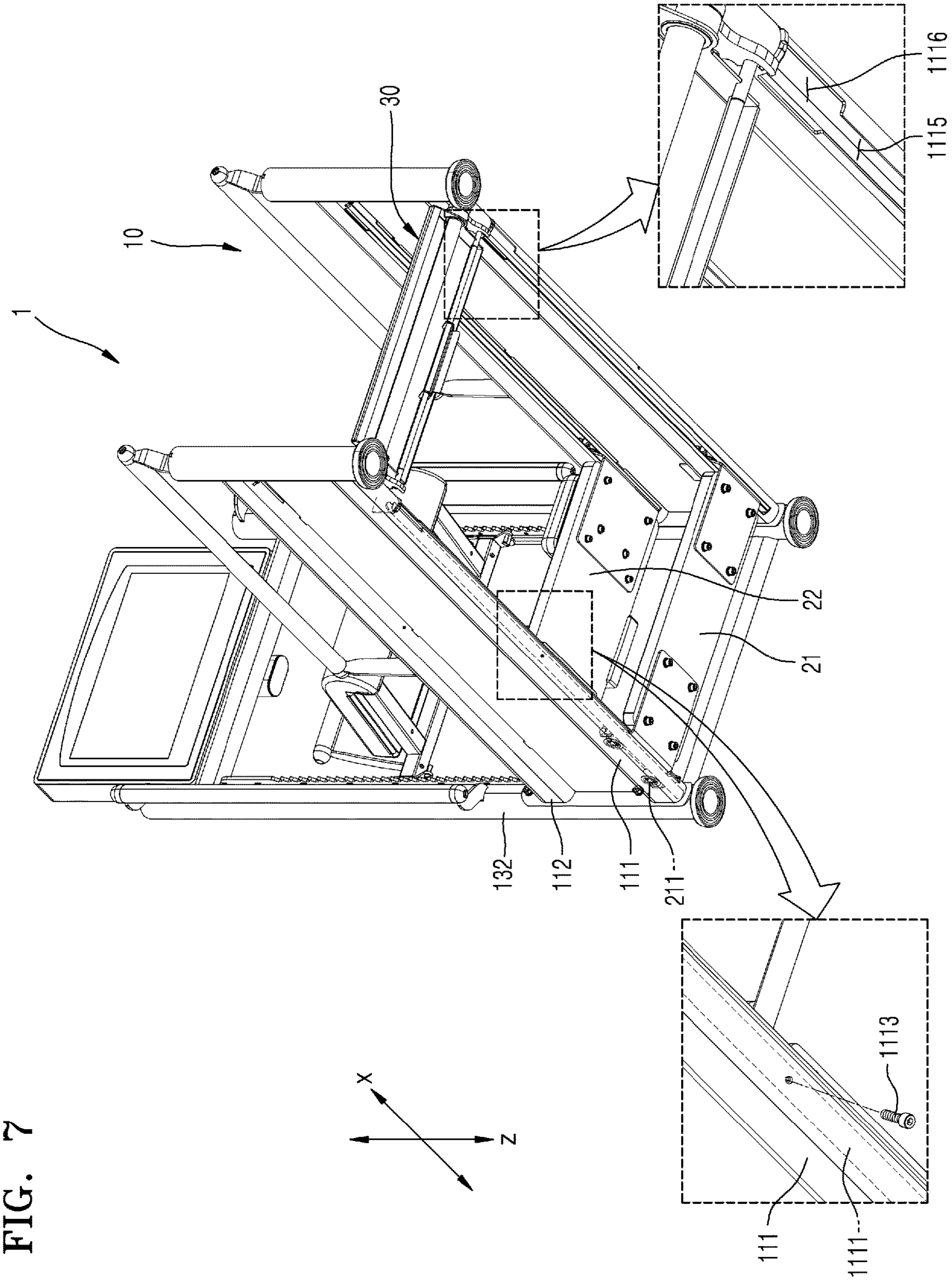
FIG. 7 is a bottom perspective view of a multi-function stretching apparatus, according to an embodiment.
Figure 8:
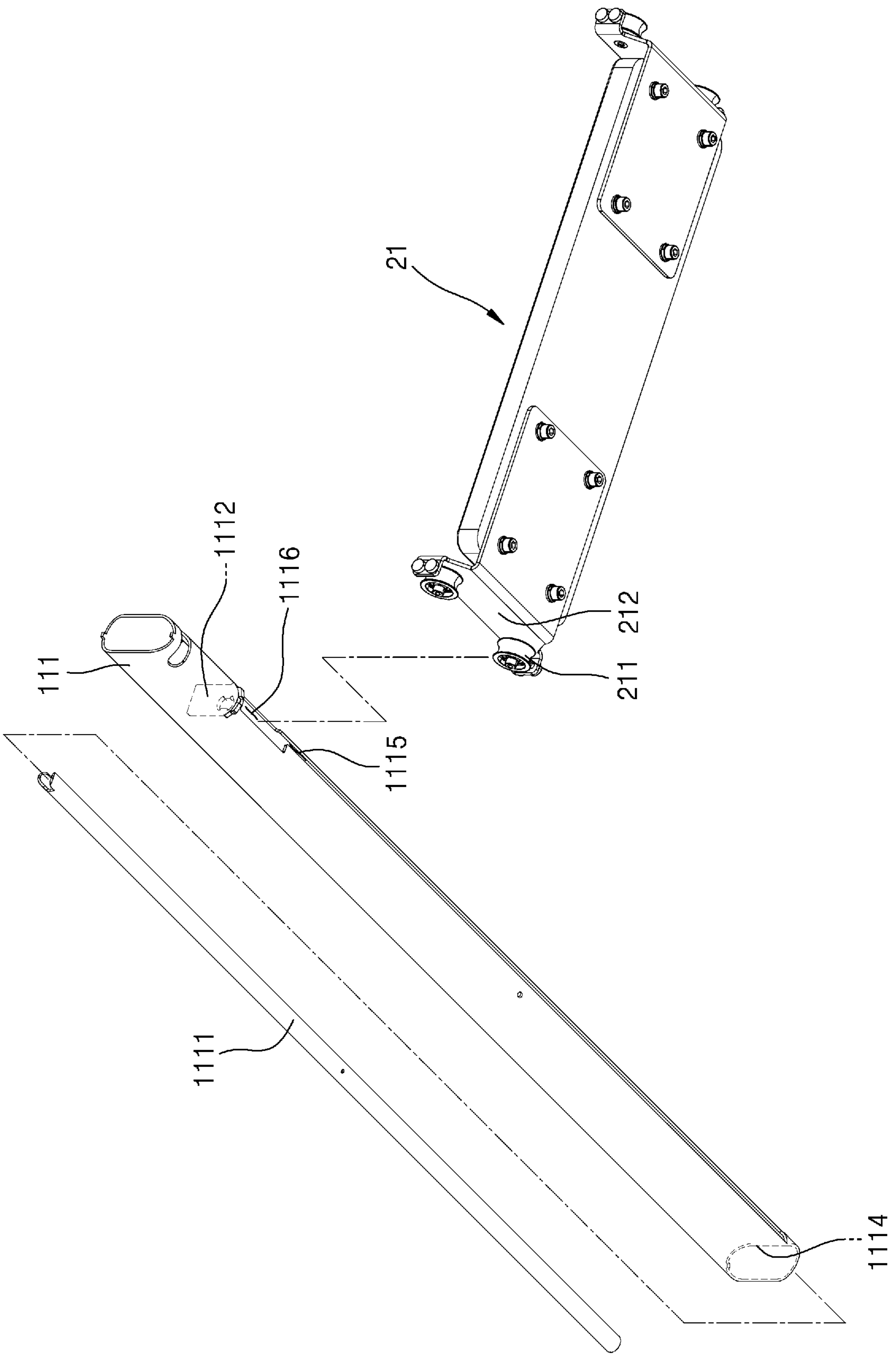
FIG. 8 is a view illustrating a process of assembling a 1st-1 stretching member to a first horizontal frame for moving in the multi-function stretching apparatus of FIG. 7.
Figure 9:
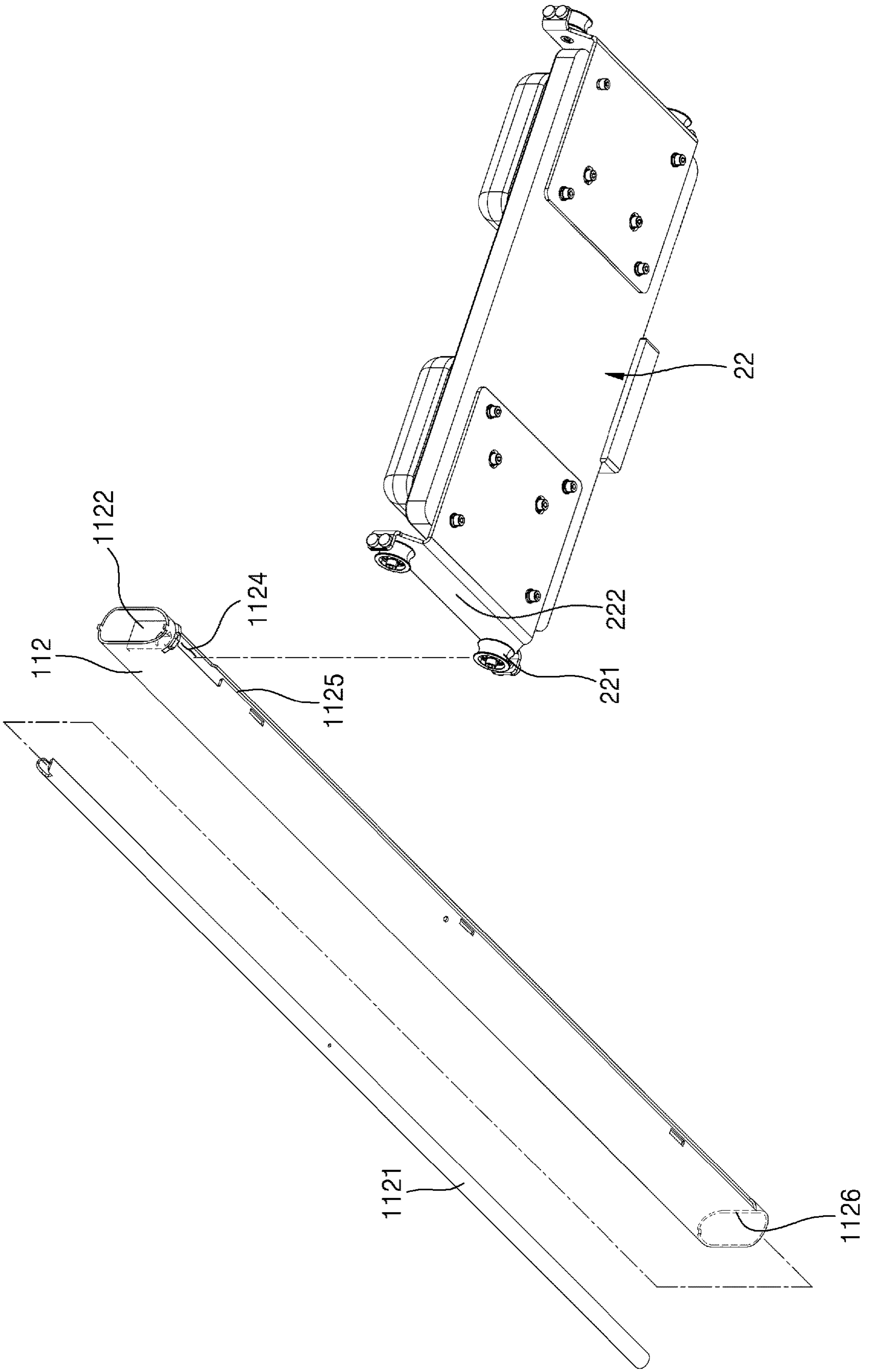
FIG. 9 is a view illustrating a process of assembling a 1st-2 stretching member to a second horizontal frame for moving in the multi-function stretching apparatus of FIG. 7.

FIG. 7 is a bottom perspective view of the multi-function stretching apparatus 1 according to an embodiment. FIG. 8 is a view illustrating a process of assembling the 1st-1 stretching member 21 with the first horizontal frame 111 such that the 1st-1 stretching member 21 is movable, in the multi-function stretching apparatus 1 of FIG. 7. FIG. 9 is a view illustrating a process of assembling the 1st-2 stretching member 22 with the second horizontal frame 112 such that the 1st-2 stretching member 22 is movable, in the multi-function stretching apparatus 1 of FIG. 7.

Referring to FIG. 7, the first guide rail 1111 may be fixed to the first horizontal frame 111 by a fixing member 1113. The first guide rail 1111 may be prevented from moving in the front-back direction X within the first horizontal frame 111 by the fixing member 1113. Because the fixing member 1113 is an optional component, the fixing member 1113 may be omitted as needed. For example, both end portions of the first guide rail 1111 may be respectively supported by the second support frame 132 and the first stopper 1112 and may be fixed inside the first horizontal frame 111 without the fixing member 1113.

The first horizontal frame 111 may have a structure into which the first guide rail 1111 and the first guide wheel 211 are inserted. For example, a first opening 1114 through which the first guide rail 1111 is inserted may be formed in at least one of both end portions of the first horizontal frame 111 in the front-back direction X. A lower portion of the first horizontal frame 111 may include a first guide hole 1115 through which a first wheel support 212 supporting the first guide wheel 211 passes and a first insertion hole 1116 which is formed at one end portion of the first guide hole 1115 and through which the first guide wheel 211 is insertable into the first horizontal frame 111.

Referring to FIG. 8, in a manufacturing process of the multi-function stretching apparatus 1, the first guide wheel 211 is inserted into the first horizontal frame 111 through the first insertion hole 1116 of the first horizontal frame 111. Next, the first guide rail 1111 is inserted into the first horizontal frame 111 through the first opening 1114 of the first horizontal frame 111. Inside the first horizontal frame 111, a position of the 1st-1 stretching member 21 is adjusted such that the first guide wheel 211 is safely placed on the first guide rail 1111. One end portion of the first guide rail 1111 inserted into the first horizontal frame 111 may be supported by a first stopper 1112. A position of the first guide wheel 211 safely placed on the first guide rail 1111 may be maintained in the vertical direction Z by gravity and move in the front-rear direction X along the first guide rail 1111.

Referring to FIG. 9, the second horizontal frame 112 may have a structure into which a second guide rail 1121 and a second guide wheel 221 are inserted. For example, at least one of both end portions of the second horizontal frame 112 in the front-back direction X may have a second opening 1124 through which the second guide rail 1121 is inserted. An end portion of the second guide rail 1121 inserted through the second opening 1124 may be fixed by the second stopper 1122.

A lower portion of the second horizontal frame 112 may include a second guide hole 1125 through which the second wheel support 222 supporting the second guide wheel 221 passes and a second insertion hole 1126 which is formed at one end portion of the second guide hole 1125 and through which the second guide wheel 221 is insertable into the second horizontal frame 112.

Similarly to the process of inserting the first guide wheel 211 into the first horizontal frame 111, the second guide wheel may be inserted into the second horizontal frame 112.

Figure 10:
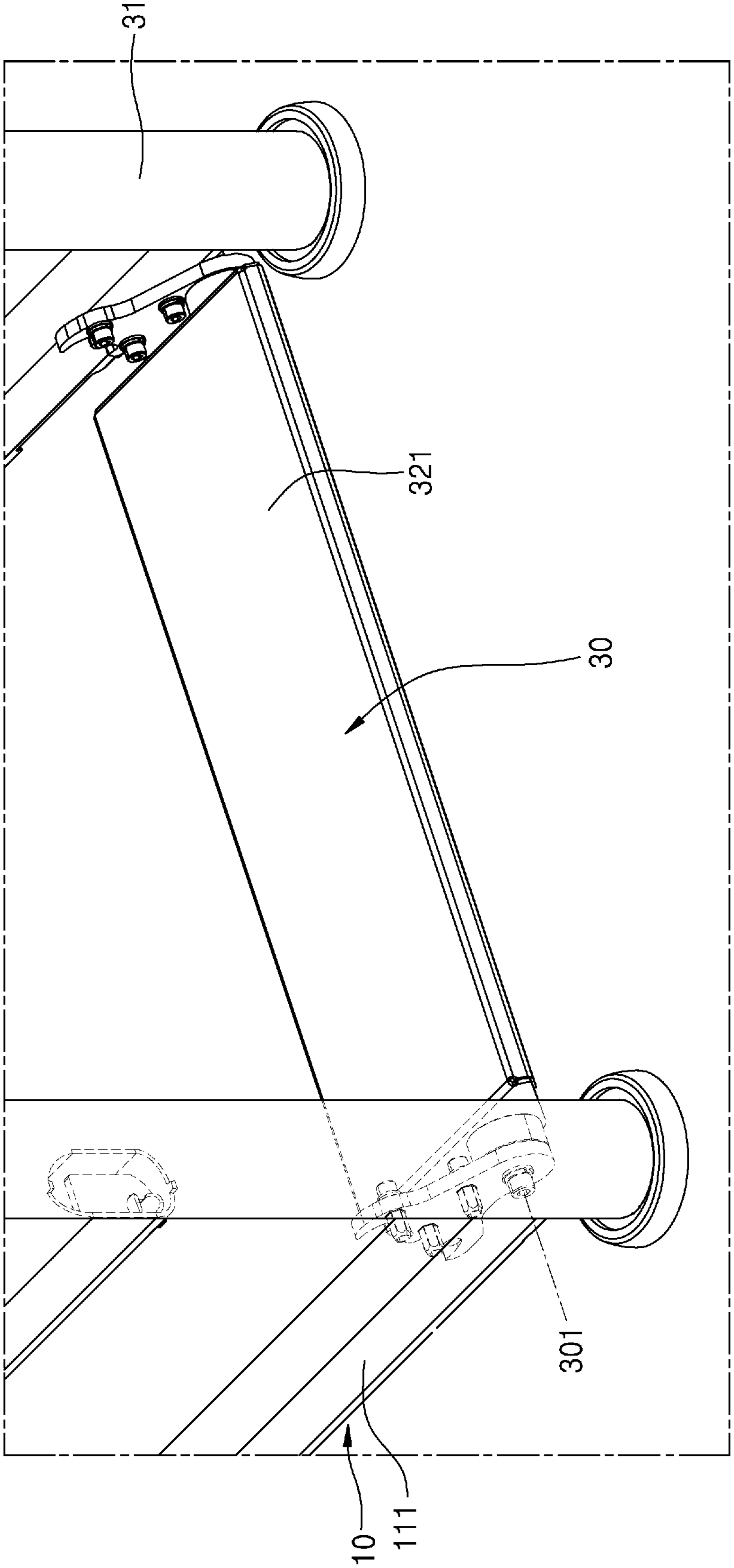
FIG. 10 is an enlarged perspective view of a second stretching member of a multi-function stretching apparatus according to an embodiment.
Figure 11:
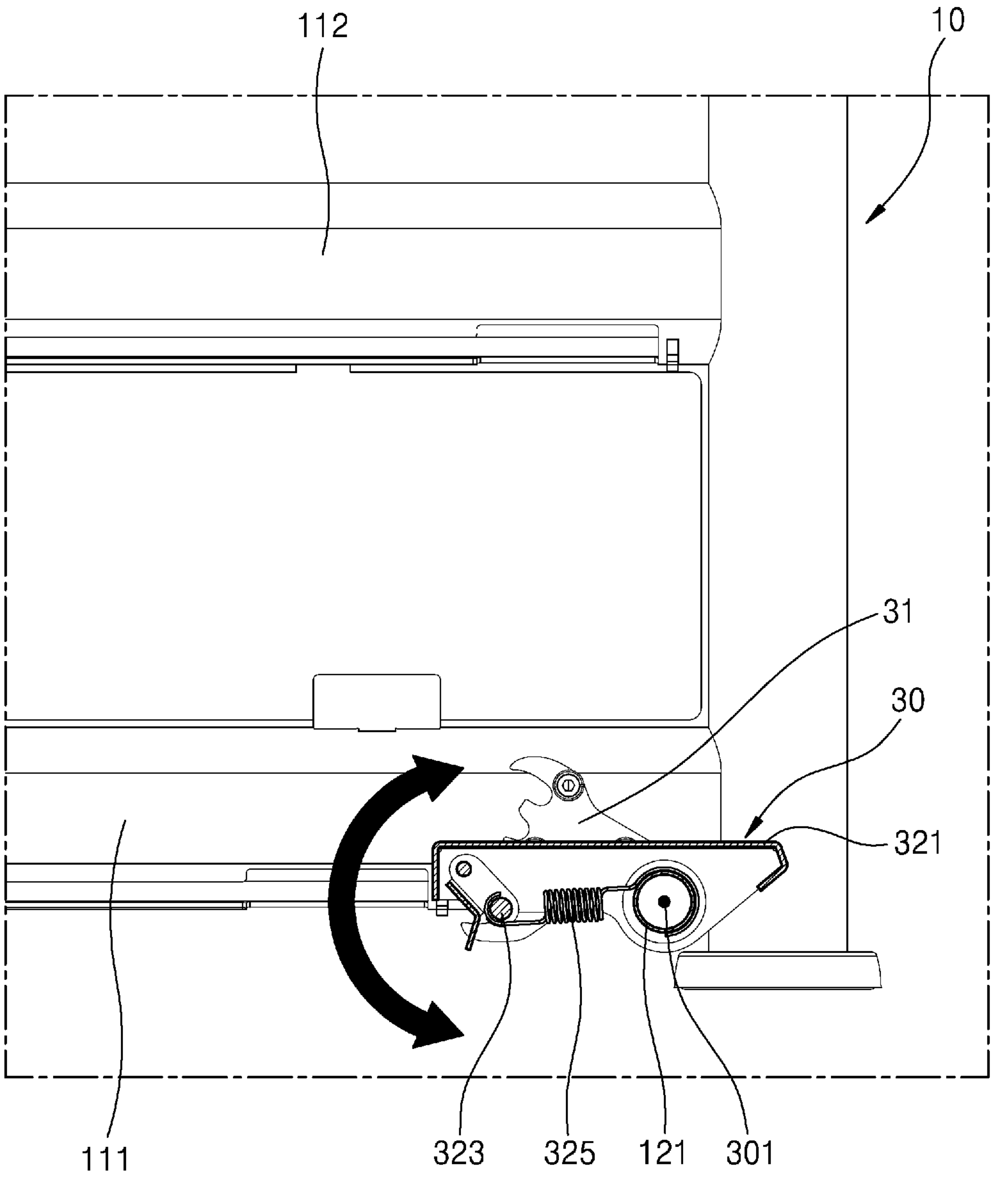
FIG. 11 is a cross-sectional view illustrating a second stretching member of a multi-function stretching apparatus according to an embodiment.
Figure 12:
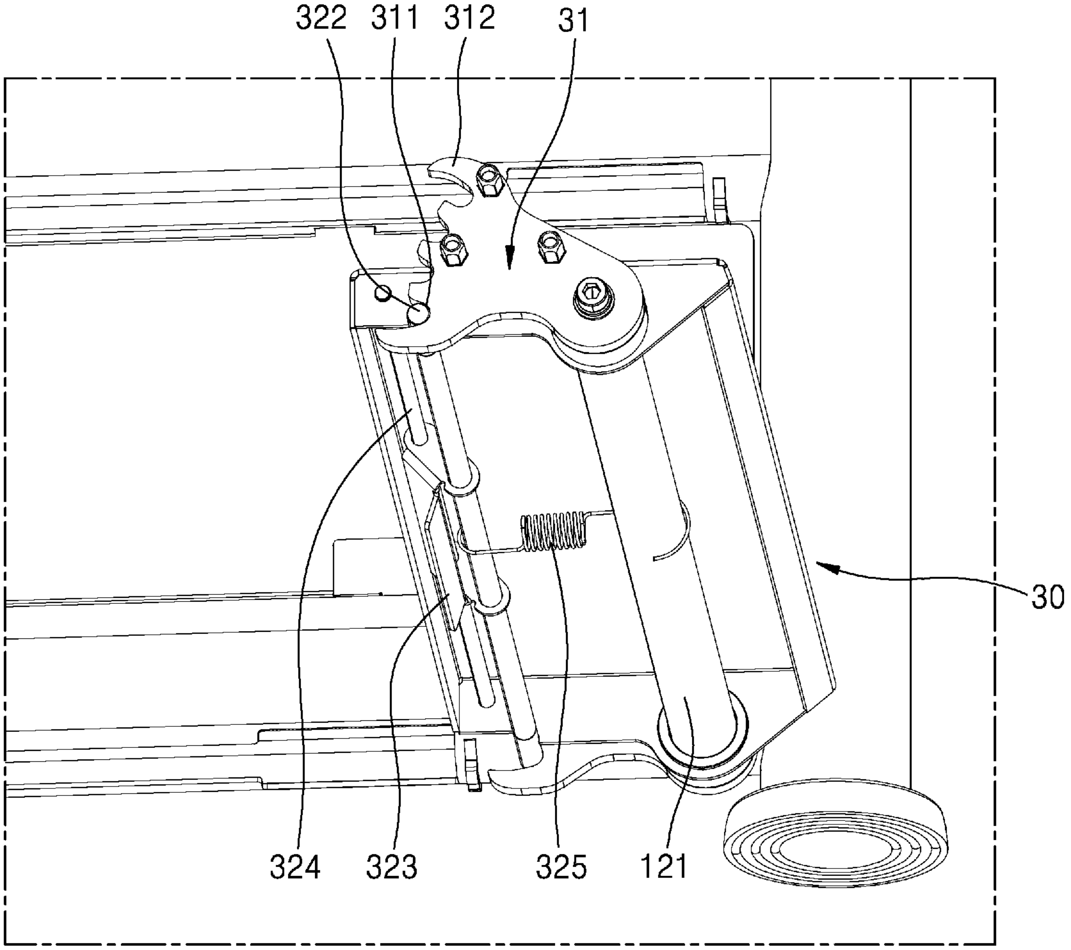
FIG. 12 is an enlarged perspective view of a second stretching member in a multi-function stretching apparatus according to the embodiment.

FIG. 10 is an enlarged perspective view of the second stretching member 30 of the multi-function stretching apparatus 1 according to the embodiment, and FIG. 11 is a cross-sectional view illustrating the second stretching member 30 of the multi-function stretching apparatus 1 according to the embodiment. FIG. 12 is an enlarged perspective view of the second stretching member 30 of the multi-function stretching apparatus 1 according to the embodiment.

Referring to FIGS. 1, 10, and 11, the second stretching member 30 may be between the plurality of horizontal frames 11. The second stretching member 30 may be between the pair of first horizontal frames 111. The second stretching member 30 may be on a front side between the pair of first horizontal frames 111.

The second stretching member 30 may be supported on the first horizontal frame 111 to be rotatable about a preset rotation axis 301. For example, the second stretching member 30 may be supported by a rotation support 31 provided on the first horizontal frame 111 to be rotatable about the rotation axis 301.

Referring to FIGS. 10 to 12, the second stretching member 30 may be provided in the body frame 10 to be angle-adjustable. For example, the second stretching member 30 may include a plate 321 for a user to place the sole of the foot thereon, and an angle adjustment rod 322 provided at a lower portion of the plate 321. The rotation support 31 may include a plurality of angle adjustment grooves 311 into which the angle adjustment rod 322 may be inserted.

The angle adjustment rod 322 may be rotatable by an angle adjustment handle 323. For example, the angle adjustment handle 323 may connect the angle adjustment rod 322 to a rotation shaft 324 such that the angle adjustment rod 322 may rotate about the rotation shaft 324. The angle adjustment handle 323 may connect a central portion of the angle adjustment rod 322 to a central portion of the rotation shaft 324. When a user pulls the angle adjustment handle 323, the angle adjustment rod 322 connected to the angle adjustment handle 323 rotates around the rotation shaft 324 to be separated from and the angle adjustment groove 311 of the rotation support 31. When the angle adjustment rod 322 is inserted into another angle adjustment groove 311, the second stretching member 30 may have a different angle with respect to the body frame 10.

The second stretching member 30 may further include a pressing member 325 that presses the angle adjustment rod 322 to rotate in a preset rotation direction about the rotation shaft 324. The pressing member 325 may be an elastic body that provides elastic force. For example, the elastic body may include a springs or a rubber member but is not limited thereto. One end portion of the pressing member 325 may be supported by the angle adjustment rod 322, and the other end portion of the pressing member 325 may be supported by the first connection frame 121. By the pressing member 325, the angle adjustment rod 322 may maintain a state in which the angle adjustment rod 322 is inserted into the angle adjustment groove 311.

The rotation support 31 may include a rotation stopper 312 that limits a movement range of the angle adjustment rod 322 such that the angle adjustment rod 322 separated from the angle adjustment groove 311 is not separated from the rotation support 31. For example, the rotation stoppers 312 protruding backward may be provided in both end portions of the rotation support 31 in the vertical direction Z.

The first connection frame 121 for maintaining an interval between the pair of first horizontal frames 111 may be arranged on the same axis as the rotation axis 301 of the second stretching member 30. By arranging the first connection frame 121 on the same axis as the rotation axis 301 of the second stretching member 30, a size of the multi-function stretching apparatus 1 may be reduced, and interference with a user's stretching motion may be prevented.

When the first connection frame 121 is placed at the rear of the second stretching member 30, interference with the movement of the 1st-1 stretching member 21 in the front-rear direction X may occur, and in order to avoid this, a length of the multi-function stretching apparatus 1 may be increased in the front-back direction X. When the first connection frame 121 is in front of the second stretching member 30, for example, between the pair of first support frames 131, the first connection frame 121 may interfere with an operation using the second stretching member 30 or may interfere with an operation using the 1st-2 stretching member 22. When the first connection frame 121 is below the second stretching member 30 and is not on the same axis as the rotation axis 301 of the second stretching member 30, the first connection frame 121 may interfere with the rotation of the second stretching member 30. In addition, in the multi-function stretching apparatus 1 according to the embodiment, the first connection frame 121 is on the same axis as the rotation axis 301 of the second stretching member 30, and accordingly, a length of the multi-function stretching apparatus 1 in the front-rear direction X may be reduced, and a user's stretching motion is not interfered.

The second stretching member 30 may be at the same height as the first stretching member 21. That is, the second stretching member 30 may partially overlap the 1st-1 stretching member 21 in the front-back direction X.

For example, the 1st-1 stretching member 21 may be installed on the first horizontal frame 111 to be movable in the front-back direction X, and the second stretching member 30 may be installed on the first horizontal frame 111 to be rotatable. The first horizontal frame 111 may include a first stopper 1112 that limits a movement distance of the 1st-1 stretching member 21. The first stopper 1112 may prevent the 1st-1 stretching member 21 from coming into contact with the second stretching member 30.

Figure 13:
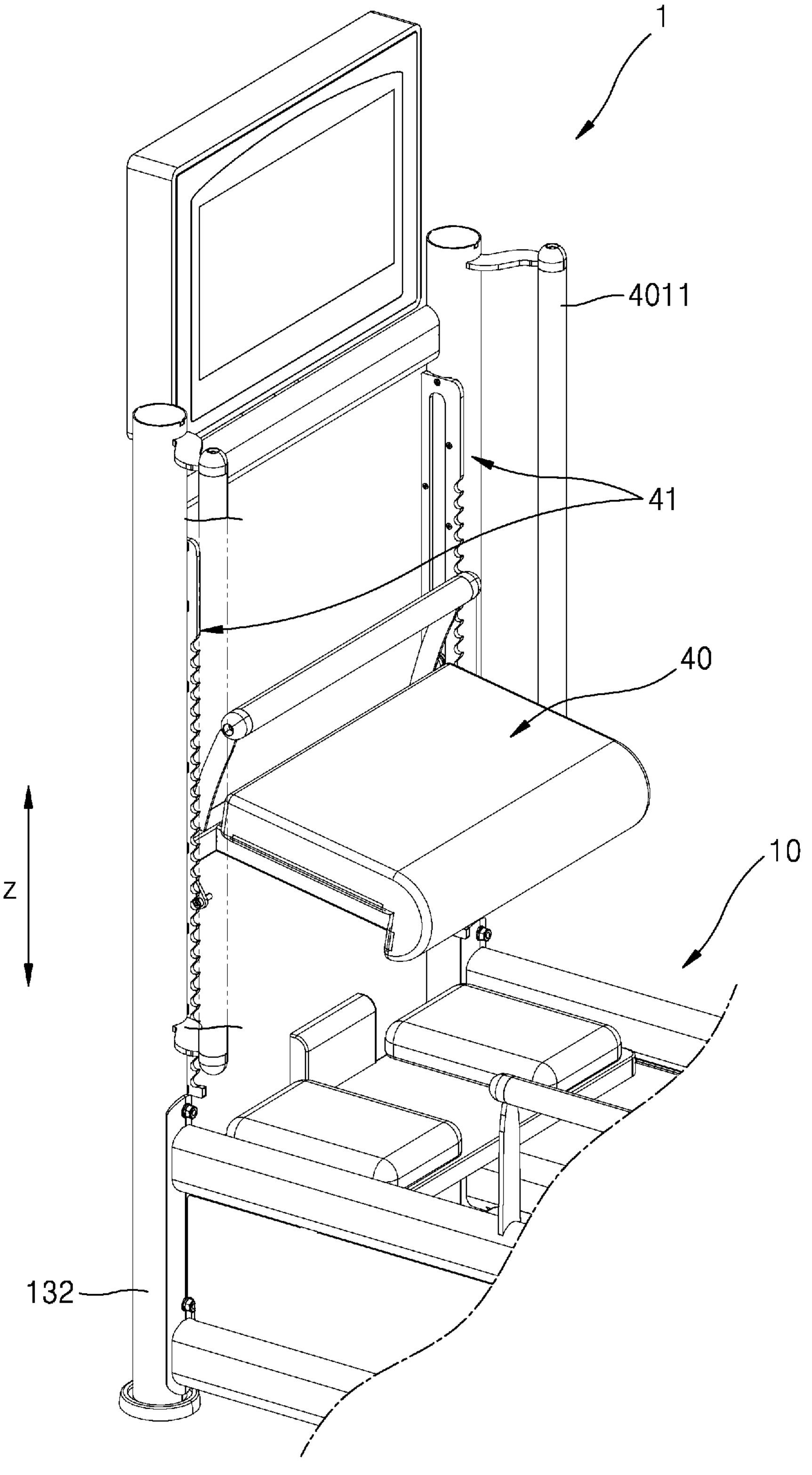
FIG. 13 is a perspective view illustrating a portion of a multi-function stretching apparatus to describe a third stretching member of the multi-function stretching apparatus according to an embodiment.
Figure 14:
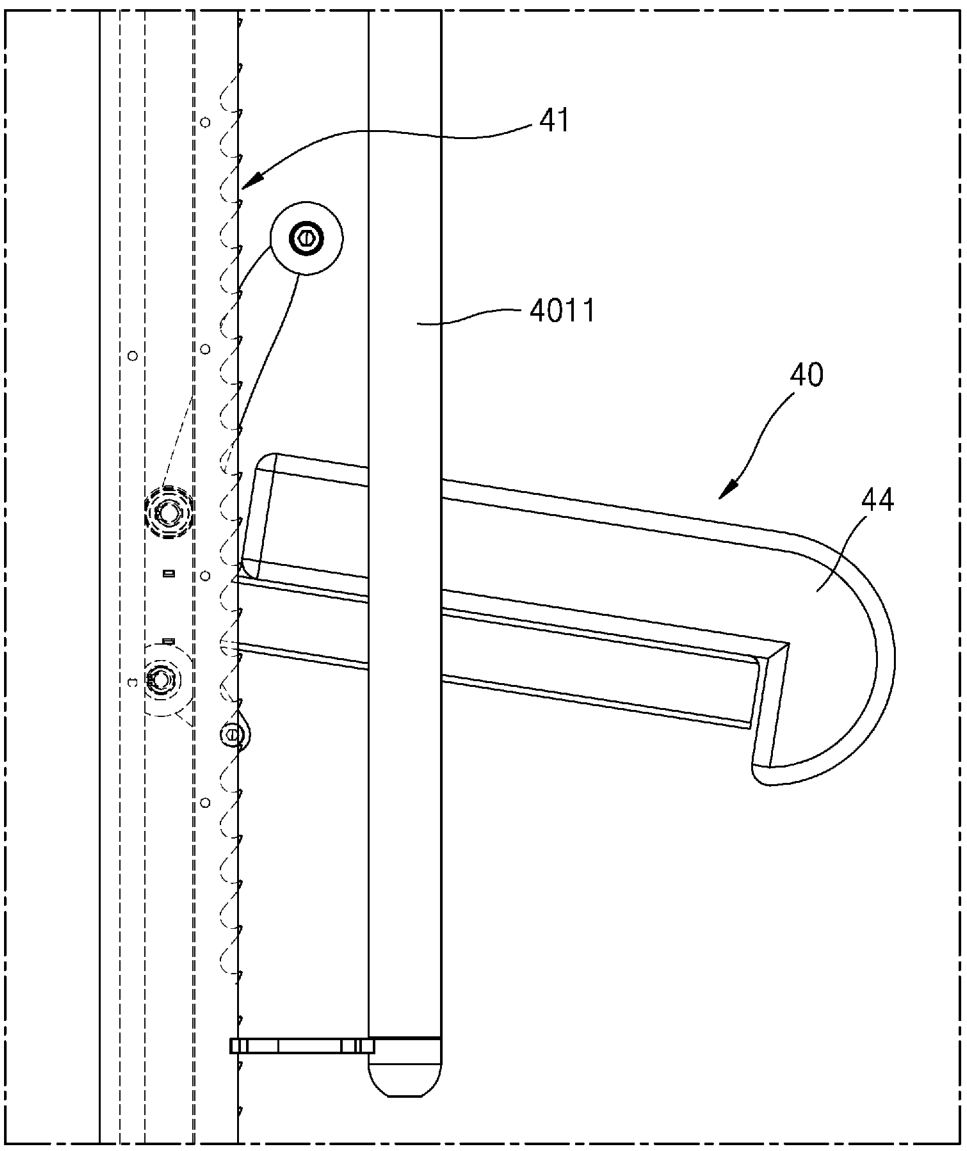
FIG. 14 is an enlarged view of a part of FIG. 13 to describe an operating structure of the third stretching member of FIG. 13.
Figure 15:
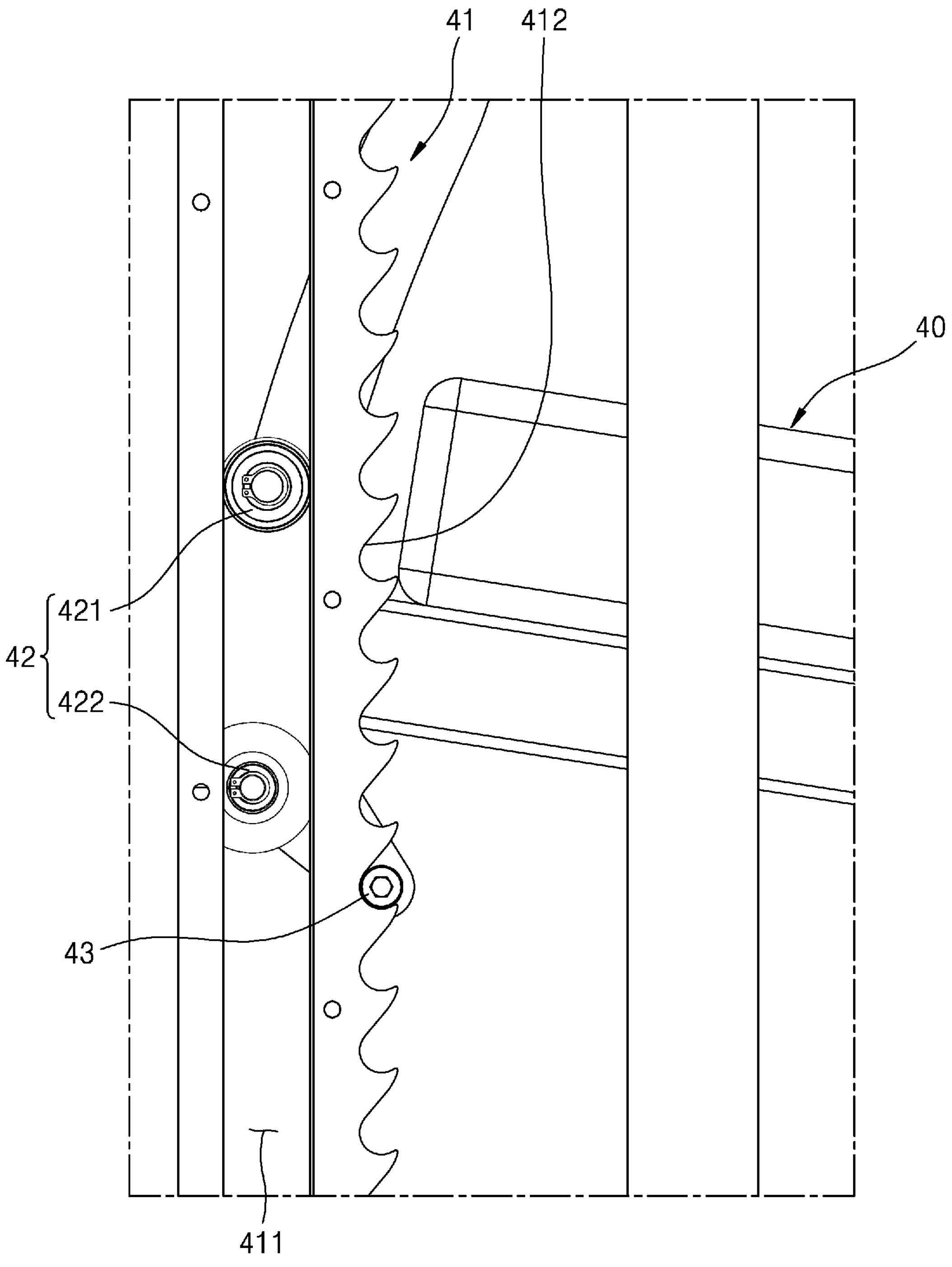
FIG. 15 is an enlarged view of a part of the third stretching member of FIG. 14.

FIG. 13 is a perspective view illustrating a part of the multi-function stretching apparatus to describe the third stretching member 40 of the multi-function stretching apparatus 1 according to the embodiment, and FIG. 14 is an enlarged view of a part of FIG. 13 to describe an operating structure of the third stretching member 40 of FIG. 13. FIG. 15 is an enlarged view of a part of the third stretching member 40 of FIG. 14.

Referring to FIGS. 13 to 15, the third stretching member 40 according to the embodiment may be provided in the body frame 10 to be height-adjustable in the vertical direction Z. For example, the third stretching member 40 may be installed on the second support frame 132 such that a height of the third stretching member 40 may be adjusted in the vertical direction Z. The third stretching member 40 may include a third handle 4011 extending in the horizontal direction.

The third stretching member 40 may be between the pair of second support frames 132. The second support frame 132 may be provided with a height support 41 for supporting the third stretching member 40 at a plurality of heights.

The height support 41 may include a height guide slit 411 extending in the vertical direction Z and a plurality of height adjustment grooves 412 arranged in the vertical direction Z.

at least one height adjustment bearing 42 that is inserted into the height guide slit 411 of the height support 41, and a height adjustment protrusion 43 that is separated from the height adjustment bearing 42 and is insertable into one of the plurality of height adjustment grooves 412 may be respectively formed at both end portions of the third stretching member 40.

The at least one height adjustment bearing 42 may be plural. For example, the height guide bearing 42 may include a first bearing 421 and a second bearing 422 which are inserted into the height guide slit 411.

The first bearing 421 is above the second bearing 422, and a diameter of the first bearing 421 may be greater than a diameter of the second bearing 422. The diameter of the first bearing 421 may be less than a width of the height guide slit 411.

The diameter of the second bearing 422 may be less than the diameter of the first bearing 421. The diameter of the second bearing 422 may be less than the width of the height guide slit 411. A difference between the diameter of the second bearing 422 and the width of the height guide slit 411 may be greater than a difference between the diameter of the first bearing 421 and the width of the height guide slit 411. Accordingly, the second bearing 422 may rotate about the first bearing 421.

Positions of the first bearing 421, the second bearing 422, and the height adjustment protrusion 43 are fixed to both end portions of the third stretching member 40. Accordingly, as the second bearing 422 rotates about the first bearing 421, the height adjustment protrusion 43 may also rotate about the first bearing 421. Due to the rotation of the height adjustment protrusion 43, the height adjustment protrusion 43 may be separated from the height adjustment groove 412 and may be inserted into another height adjustment groove 412. In this way, a height of the third stretching member 40 may be adjusted by selectively inserting the height adjustment protrusion 43 into the plurality of height adjustment grooves 412.

A seat pad 44 may be provided on the third stretching member 40. The seat pad 44 may have a shape in which a front portion is curved. Accordingly, an upper portion of the seat pad 44 may support a part of a user's lower body, or a front portion of the seat pad 44 may support the user's back or waist.

Figure 16:
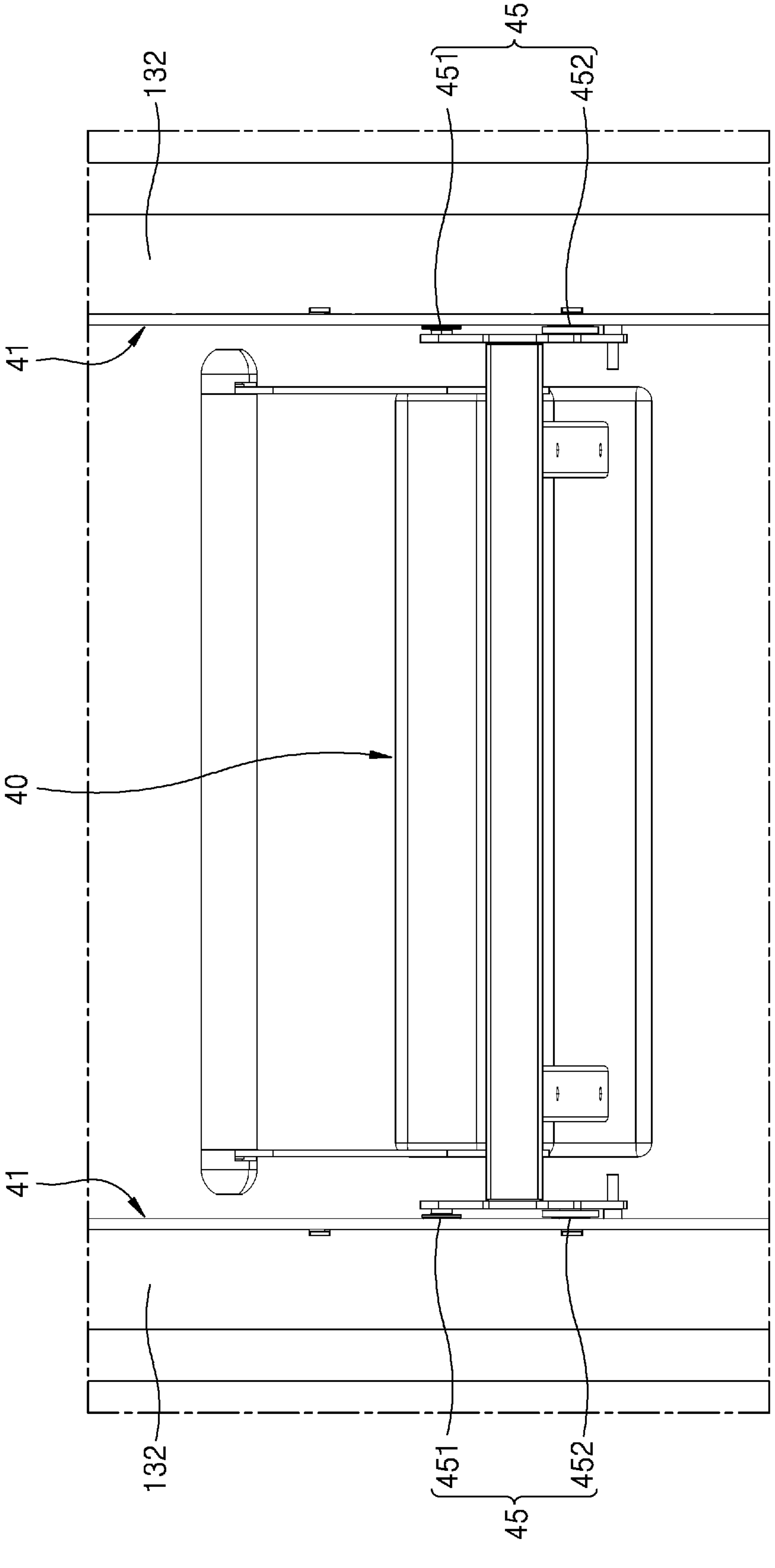
FIG. 16 is a rear view illustrating a third stretching member of a multi-function stretching apparatus according to an embodiment.
Figure 17:
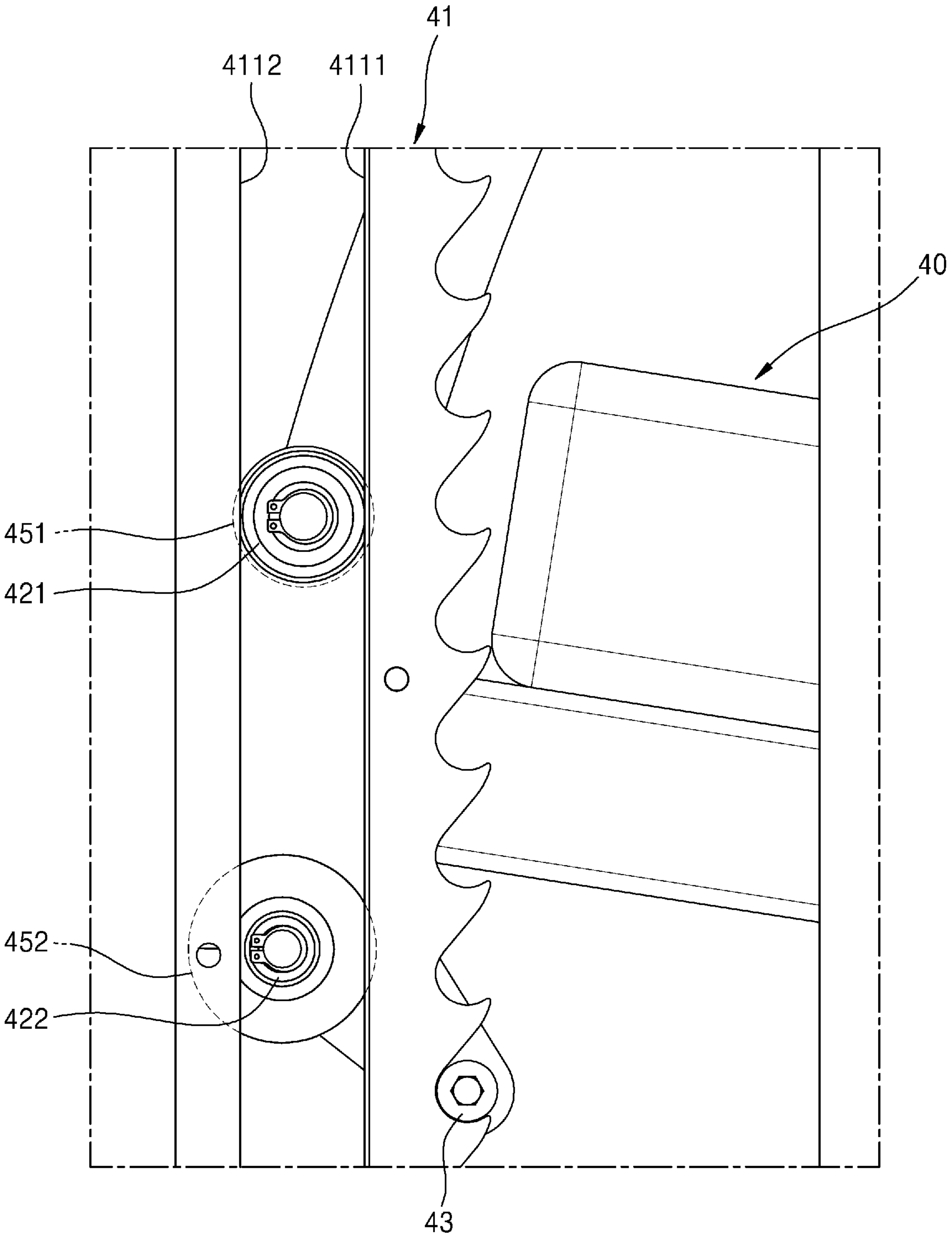
FIG. 17 is a left view of a height support for adjusting a height of a third stretching member of a multi-function stretching apparatus according to the embodiment.
Figure 18:
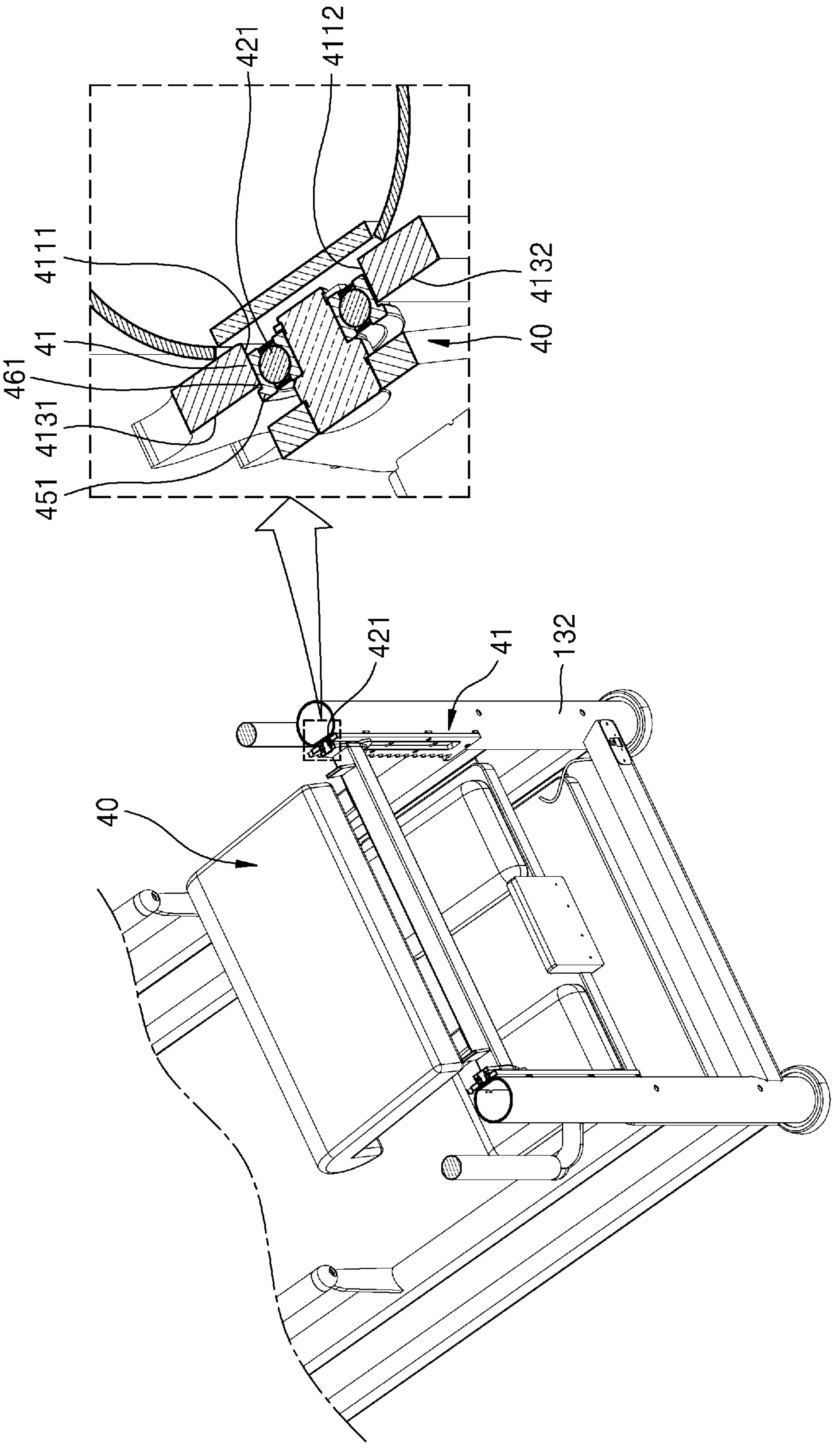
FIG. 18 is a cross-sectional horizontal perspective view of a multi-function stretching apparatus according to an embodiment.
Figure 19:
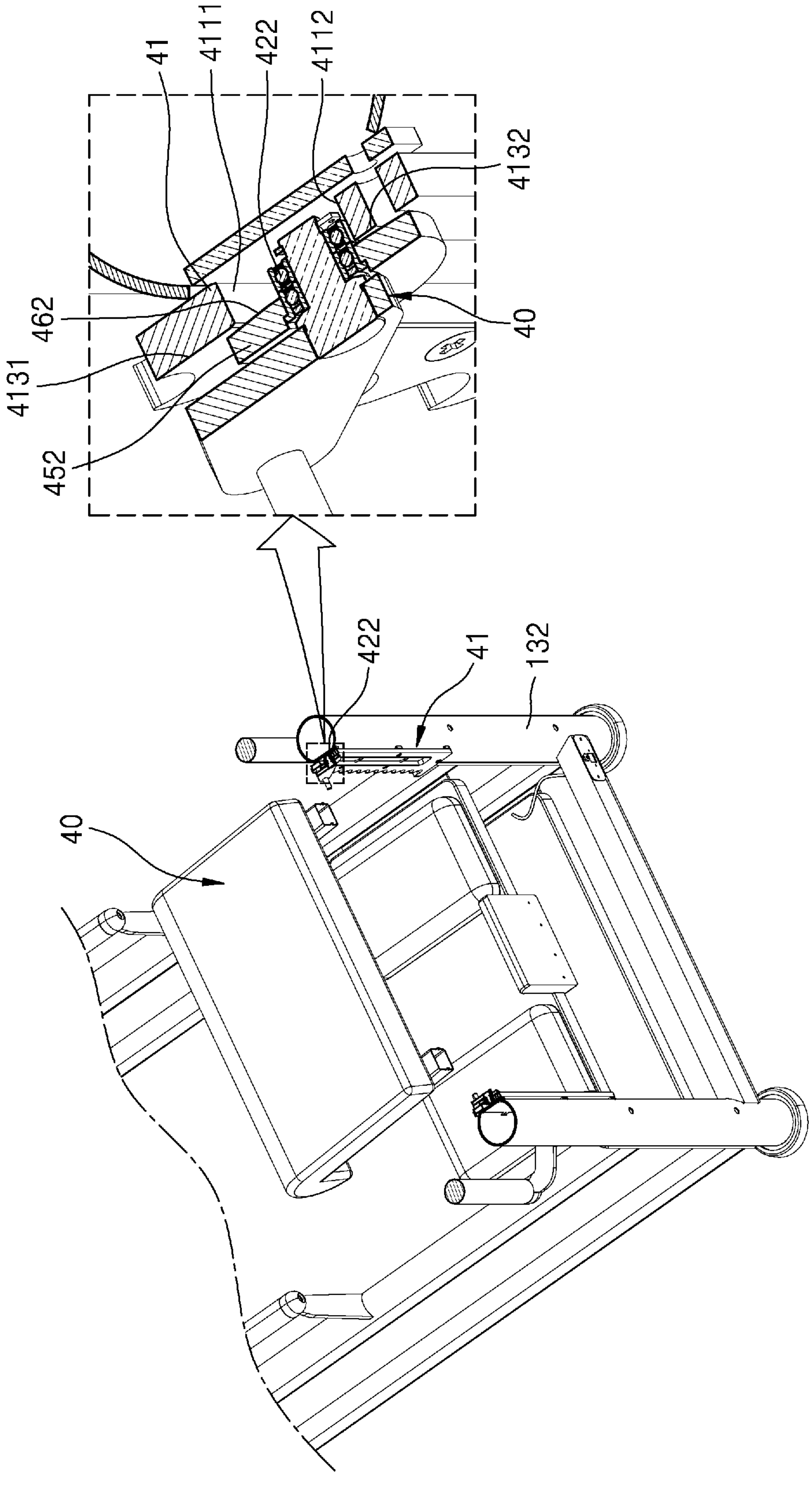
FIG. 19 is a cross-sectional horizontal perspective view of a multi-function stretching apparatus according to an embodiment.

FIG. 16 is a rear view illustrating the third stretching member 40 of the multi-function stretching apparatus 1 according to an embodiment. FIG. 17 is a left view of the height support 41 for adjusting a height of the third stretching member 40 of the multi-function stretching device 1 according to an embodiment. FIG. 18 is a cross-sectional horizontal perspective view of the multi-function stretching apparatus 1 according to an embodiment, and FIG. 19 is a cross-sectional horizontal perspective view of the multi-function stretching apparatus 1 according to an embodiment.

Referring to FIGS. 16 and 17, the multi-function stretching apparatus 1 according to the embodiment may further include a separation prevention member 45 configured to prevent the third stretching member 40 from being separated from the height support 41 in a process of adjusting a height of the third stretching member 40.

The separation prevention member 45 may be inside the height adjustment bearing 42 and may have a width greater than a width of the height guide slit 411. Accordingly, the separation prevention member 45 may prevent the height adjustment bearing 42 from being separated from the height guide slit 411.

The separation prevention member 45 may include a first flange 451 inside the first bearing 421 and a second flange 452 inside the second bearing 422. The first flange 451 may have a diameter greater than a diameter of the first bearing 421. A difference in diameter between the first flange 451 and the first bearing 421 may be 20% or less of a diameter of the first bearing 421. The second flange 452 may have a diameter greater than a diameter of the second bearing 422. A difference in diameter between the second flange 452 and the second bearing 422 may be 100% or more and 400% or less of the diameter of the second bearing 422. The diameter of the second flange 452 may be greater than the diameter of the first flange 451.

At least one of the height support 41 and the separation prevention member 45 may have an anti-jamming slope configured to prevent the separation prevention member 45 from being caught in the height support 41 during a vertical movement of the third stretching member 40.

For example, referring to FIG. 18, a first inclined surface 461 may be provided in a portion of the height support 41 facing the first flange 451. The first inclined surface 461 may be between the first inner surface 4131 of the height support 41 and a first guide surface 4111 defining the height guide slit 411. The first inclined surface 461 may have an inclination with respect to the first inner surface 4131. In this way, even when a part of the first flange 451 comes into contact with a second inner surface 4132 of the height support 41, another part of the first flange 451 may not come into contact with the first inner surface 4131 of the height support 41 due to the first inclined surface 461.

For example, referring to FIG. 19, a second inclined surface 462 may be provided on a portion of the second flange 452 facing the height support 41. Due to the second inclined surface 462, a distance from the height support 41 increases as a distance from the center of the second flange 452 increases. Accordingly, when the second bearing 422 comes into contact with or approaches a second guide surface 4112 defining the height guide slit 411, the second inclined surface 462 of the second flange 452 may not come into contact with the first inner surface 4131 of the height support 41 even when the second inclined surface 462 comes into contact with the second inner surface 4132 of the height support part 41.

Hereinafter, a stretching motion using the multi-function stretching device 1 described above is described.

Figure 20:
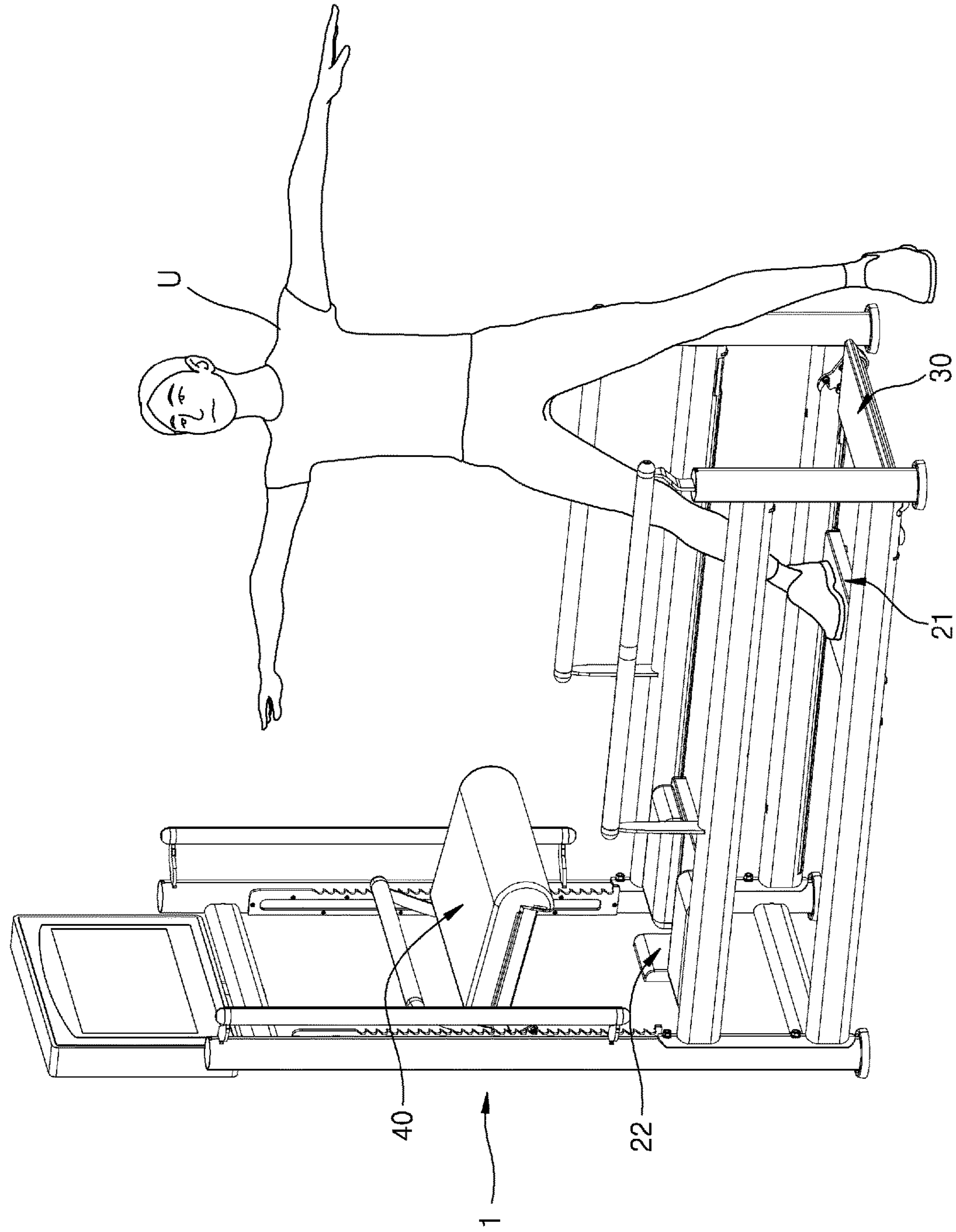
FIG. 20 is a view illustrating a stretching motion using a 1st-1 stretching member of a multi-function stretching device according to an embodiment.
Figure 21:
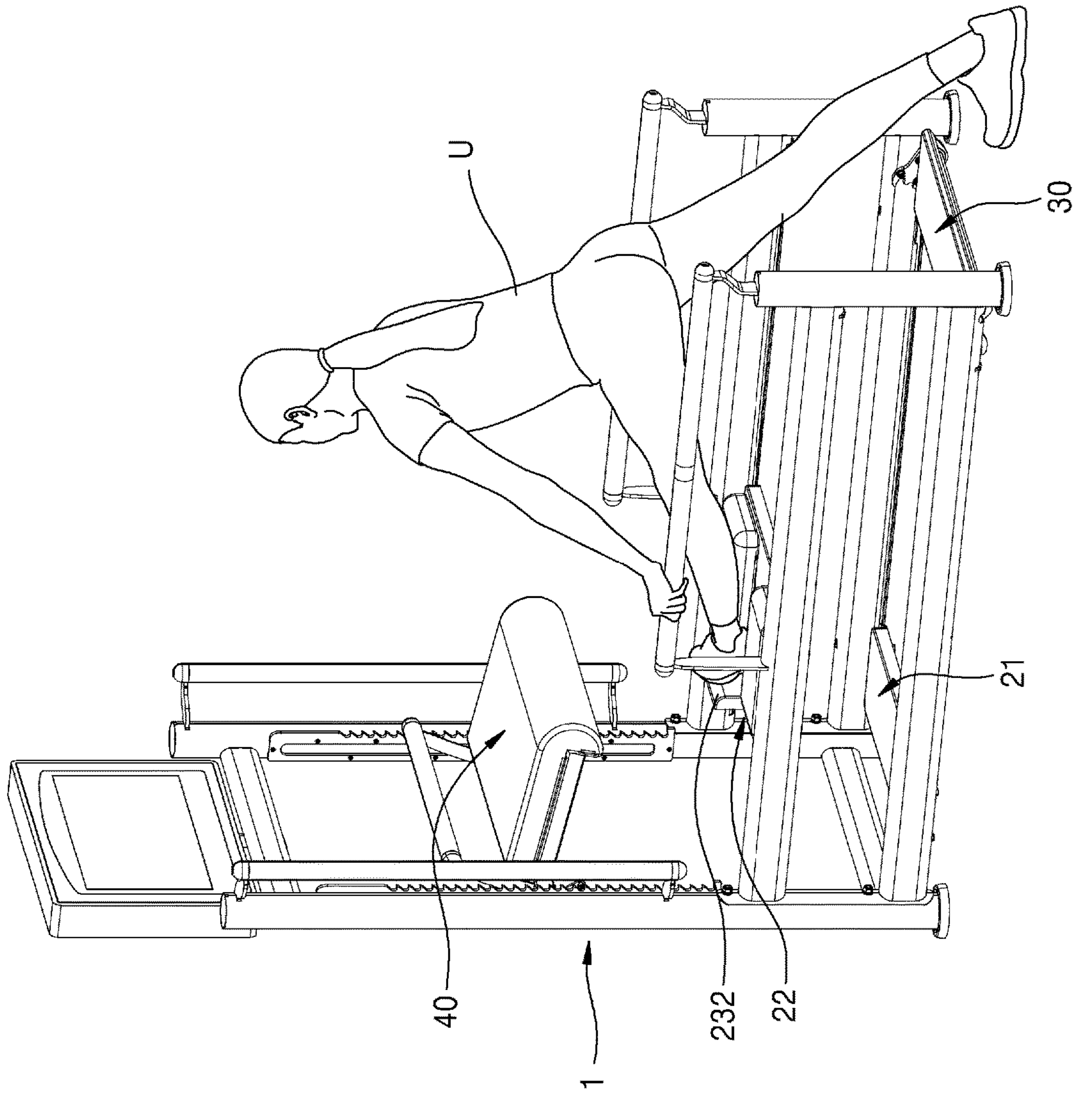
FIG. 21 is a view illustrating a stretching motion using a 1st-2 stretching member of a multi-function stretching device according to an embodiment.
Figure 22:
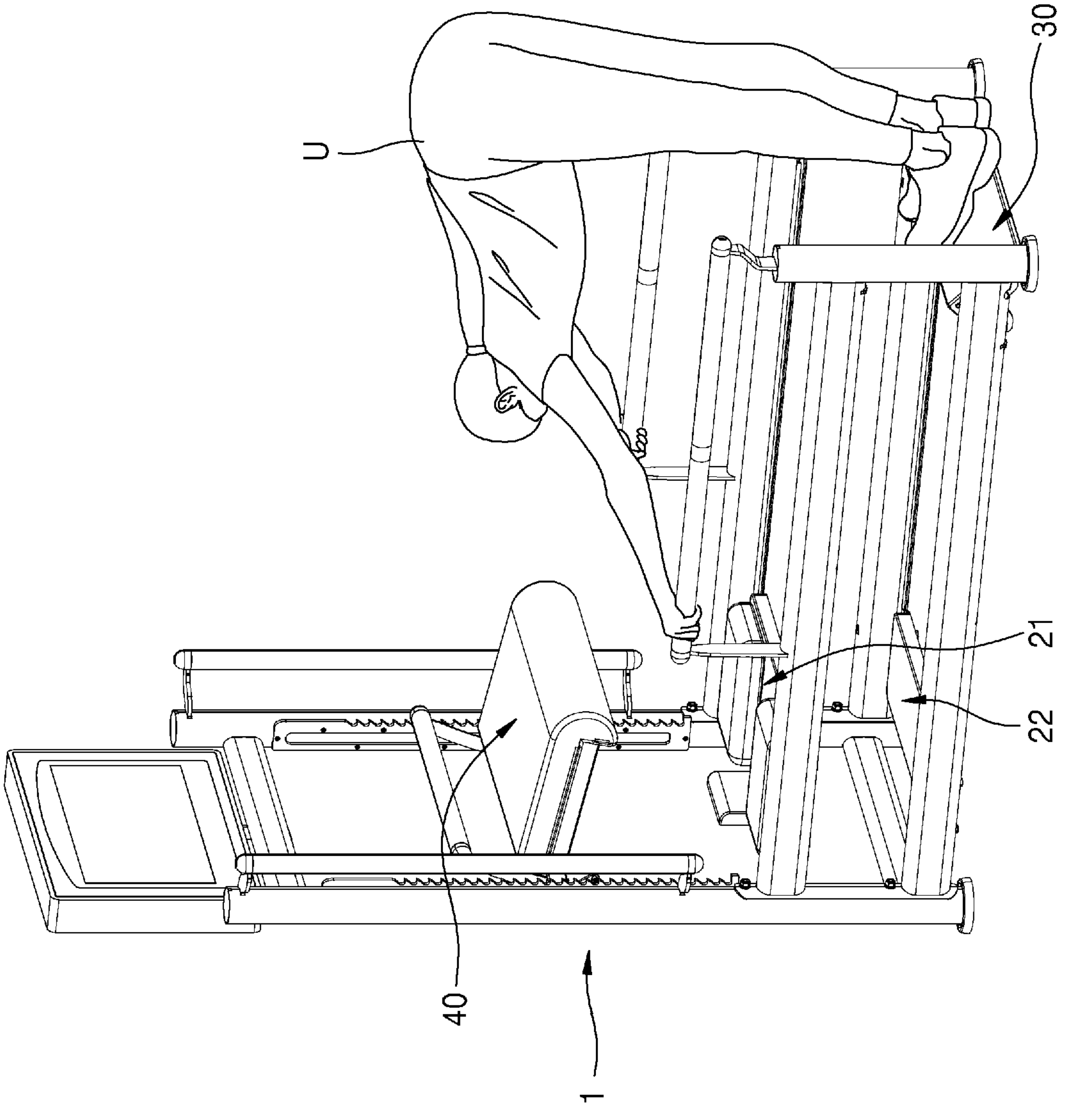
Figure 23:
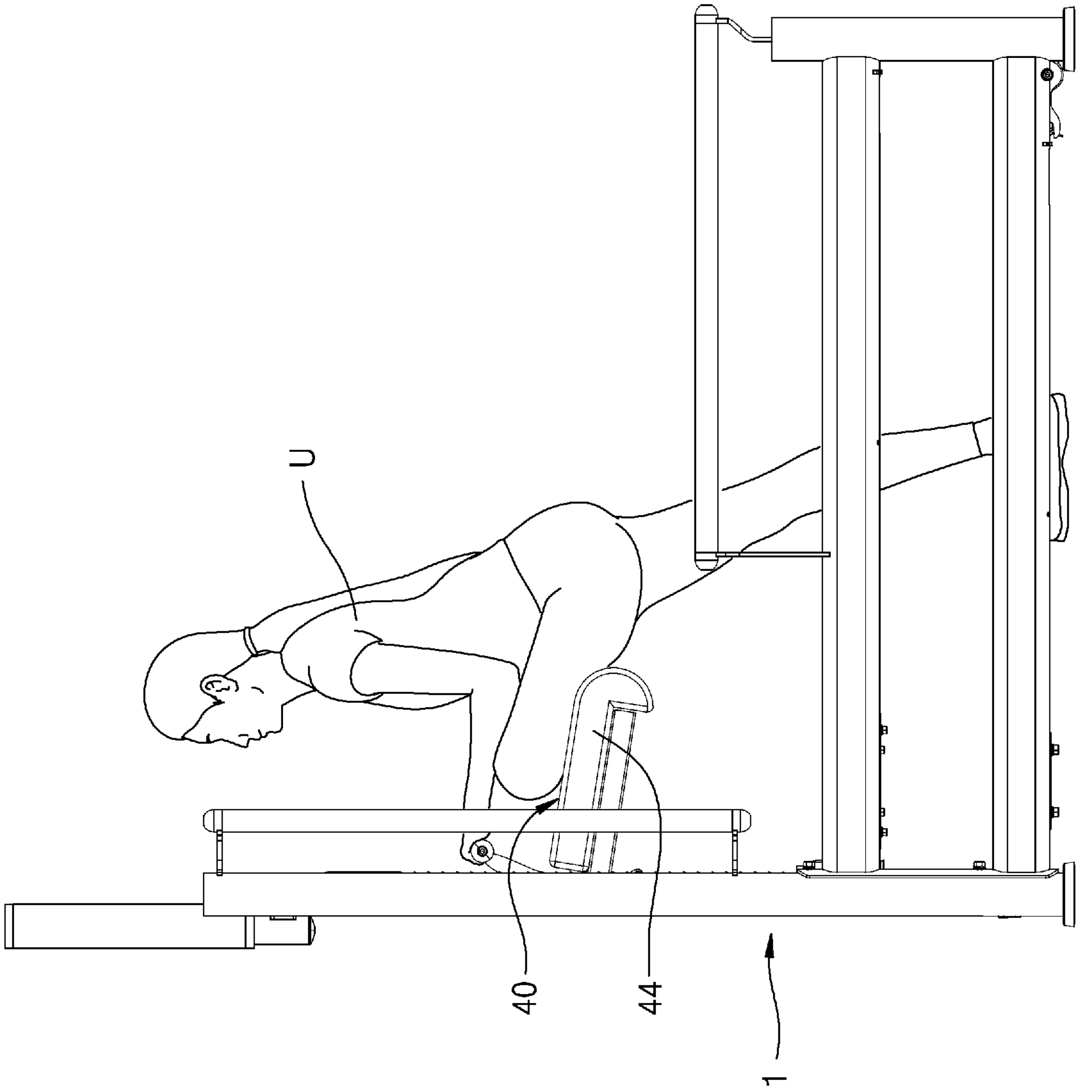
FIG. 23 is a view illustrating a stretching motion using a third stretching member of a multi-function stretching device according to an embodiment.

FIG. 20 is a view illustrating a stretching motion using a 1st-1 stretching member of the multi-function stretching apparatus 1 according to an embodiment, and FIG. 21 is a view illustrating a stretching motion using a 1st-2 stretching member of the multi-function stretching apparatus 1 according to an embodiment. FIG. 22 is a view illustrating a stretching motion using a second stretching member of the multi-function stretching apparatus 1 according to an embodiment, and FIG. 23 is a view illustrating a stretching motion using a third stretching member of the multi-function stretching apparatus 1 according to an embodiment.

Referring to FIG. 20, a user may place his or her foot on an upper portion of the 1 st-1 stretching member 21 of the multi-function stretching device 1 and perform adductor muscle stretching. However, the motion using the 1st-1 stretching member 21 is not limited thereto and may change. For example, a user may perform hamstring stretching while supporting the heel of the foot on the upper portion of the 1st-1 stretching member 21, perform adductor muscle stretching while supporting at least a part of the sole of the foot on the upper portion of the 1-1 stretching member 21, or perform iliopsoas muscle stretching while supporting the forefoot on the upper portion of the 1st-1 stretching member 21. That is, the user may place his or her feet on the upper portion of the 1st-1 stretching member 21 of the multi-function stretching device 1 and perform one of the hamstring stretching motion, the adductor muscle stretching motion, and the iliopsoas muscle stretching motion. In addition to the stretching motions, other motions may also be made by using the 1st-1 stretching member 21. For example, a user may make a lunge motion by using the 1st-1 stretching member 21.

Referring to FIG. 21, a user may place his or her feet or knees on an upper portion of the 1st-2 stretching member 22 and make one of iliopsoas muscle stretching, hamstring stretching, and hip stretching. For example, a user may perform hamstring stretching while supporting the feet on the foot support 232 of the 1st-2 stretching member 22, perform iliopsoas muscle stretching while supporting the shin on one of the pair of pads 231, or perform hip stretching while supporting a lower body by bending the knees on the pair of pads 231.

Referring to FIG. 22, a user may place both feet or one foot on the second stretching member 30 and perform calf or pullback stretching. For example, a user bends down while supporting both feet on the inclined second stretching member 30 to perform latissimus dorsi muscle stretching, shoulder stretching, or hamstring or calf stretching, or places both feet or perform calf stretching while supporting both feet or one foot on the inclined second stretching member 30.

Referring to FIG. 23, a user may perform various types of stretching while supporting part of a lower body or part of an upper body on the third stretching member 40. For example, the user may perform hip stretching while bending and supporting the knees on an upper portion of the seat pad 44 of the third stretching member 40, or perform thoracic spine extension stretching or lumbar extension stretching by leaning the body backwards while leaning the back or waist on the front portion of the seat pad 44.

Figure 24:
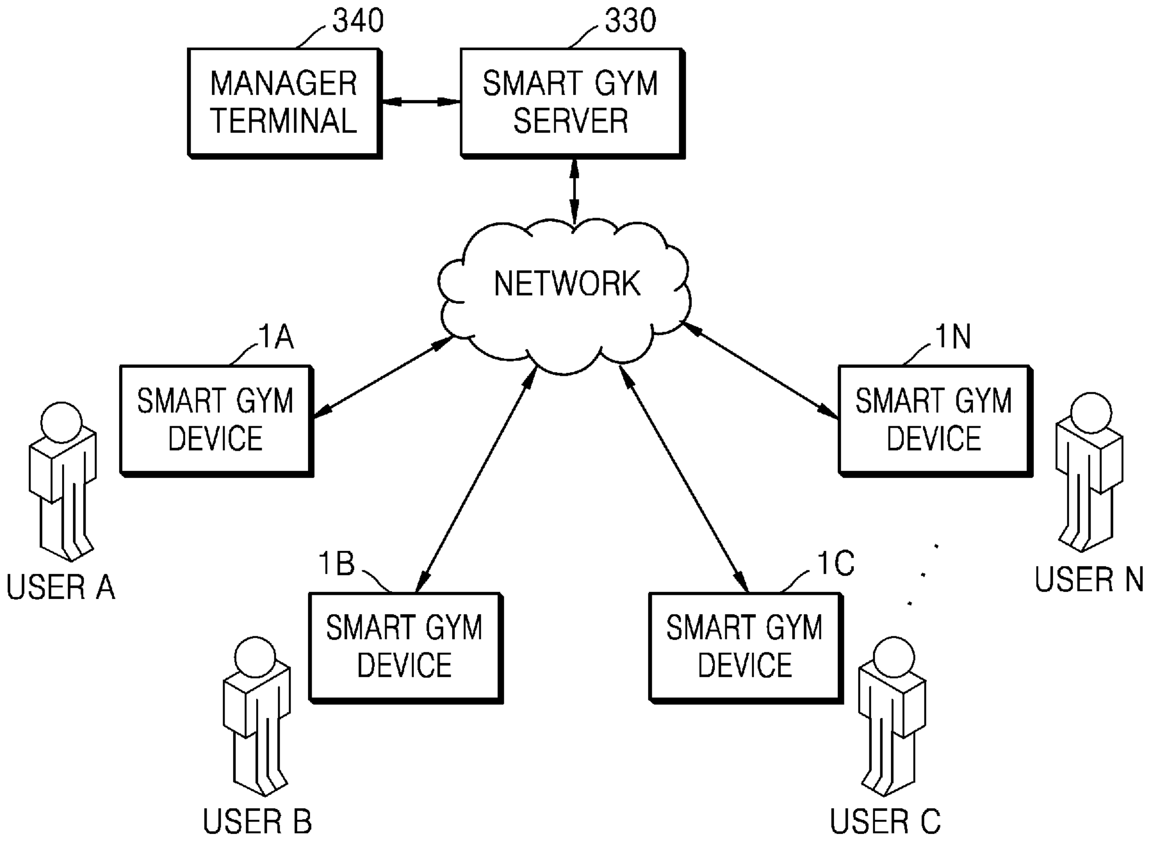
FIG. 24 is a view illustrating a smart gym environment in which a plurality of smart exercise machines are provided, according to an embodiment.

FIG. 24 is a diagram illustrating a smart gym environment in which a plurality of smart exercise devices are provided according to an embodiment.

Referring to FIG. 24, a plurality of smart exercise devices 1A, 1B, 1C, and 1N are connected to a smart gym server 330 through a network. A manager, such as a trainer or a smart gym manager, may access the smart gym server 330 through a manager terminal 340.

Users USER A, USER B, USER C, USER N who come to exercise at a smart gym verifies his or her identity by using a terminal, such as a wearable device or smartphone, and then enters the smart gym. For example, a user may enter after member verification by tagging the terminal to an unmanned terminal, such as a kiosk, at a smart gym entrance by using near field communication (NFC) or radio frequency identification (RFID). Information on a user whose membership is confirmed may be transmitted from the smart gym server 330 to at least one of the smart exercise devices 1A, 1B, 1C, and 1N through the network. At least one of the smart exercise devices 1A, 1B, 1C, and 1N may be the multi-function stretching apparatus 1 according to the embodiment described above.

When a user approaches one of the smart exercise devices 1A, 1B, 1C, and 1N and tags a wearable device to one of the smart exercise devices 1A, 1B, 1C, and 1N, the corresponding smart exercise device may automatically set an exercise program customized to a user's ability level and exercise performance history based on the information received from the smart gym server 330.

The smart gym server 330 may store user information of the users USER A, USER B, USER C, and USER N, device information of the smart exercise devices 1A, 1B, 1C, and 1N, and information used for managing other facilities or smart devices.

When a manager, such as a trainer, registers a user-customized exercise program in the manager terminal 340, the exercise process information stored in the smart gym server 330 may be updated. The smart exercise devices 1A, 1B, 1C, and 1N may receive exercise process information from the smart gym server 330 connected through a network.

In addition, although the embodiment described above provides a multi-function stretching apparatus as one of exercise devices of the smart exercise devices 1A, 1B, 1C, and 1N, the present disclosure is not limited thereto, and any exercise device for exercise may be applied in various ways.

Embodiments according to the present disclosure may be implemented in the form of a computer program that may be executed through various components of a computer, and such a computer program may be recorded on a computer-readable storage medium.

The exercise posture analysis device described above may be implemented in the form of a computer-readable storage medium including at least one program that stores instructions executable by a processor. The computer is a device capable of calling stored instructions from a storage medium and performing operations according to the disclosed embodiments in response to the called instructions, and may include an exercise posture analysis device according to the disclosed embodiments. Computer-readable storage media may include magnetic media such as a hard disk, a floppy disk, and a magnetic tape, optical recording media, such as compact disk-read only memory (CD-ROM) and a digital video disk (DVD), magneto-optical media, such as floptical disks, and hardware devices specifically configured to store and execute program instructions, such as ROM, random access memory (RAM), and flash memory. Furthermore, storage media may include intangible media implemented in a form that may be transmitted through a network, and for example, the storage media may also be a form of media implemented in the form of software or an application that may be transmitted and distributed through a network.

In addition, a computer program may be specifically designed and configured for the present disclosure or may be known and available to those skilled in the art of computer software. Examples of computer programs may include not only machine language codes that are generated by a compiler but also high-level language code that may be executed by a computer by using an interpreter or so on.

According to an embodiment of the present disclosure, a stretching device having a compact size and structure may be provided to increase space utilization of an exercise space in a sports center or a gym.

According to an embodiment of the present disclosure, a multi-function stretching apparatus, by which various types of stretching may be performed with a single device, may be provided to increase space utilization of an exercise space in a sports center or a gym.

As described above, various embodiments are provided. Those skilled in the art in which the present disclosure belongs will understand that the present disclosure may be implemented in a modification form without departing from the essential characteristics of the present disclosure. Therefore, the disclosed embodiments should be considered from an illustrative perspective rather than a restrictive perspective. The scope of the present disclosure is indicated in the claims rather than the foregoing description, and all differences within the equivalent scope should be construed as being included in the present disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A multi-function stretching apparatus comprising:
- a body frame;
- a first stretching member provided in the body frame and configured to slide forward and backward along a longitudinal direction using guide wheels;
- a second stretching member provided in the body frame and configured to be angle-adjustable; and
- a third stretching member provided in the body frame and configured to be height-adjustable,
- wherein the first stretching member, the second stretching member, and the third stretching member are arranged in the body frame such that movement paths of the first stretching member, the second stretching member, and the third stretching member do not interfere with each other, and
- when the first stretching member slides in the longitudinal direction, and the second stretching member and the third stretching member remain stationary, a distance between the first stretching member and the second stretching member and a distance between the first stretching member and the third stretching member change.

2. The multi-function stretching apparatus of claim 1, wherein a first movement path when the first stretching member is moved in the longitudinal direction is separated from a second movement path when the second stretching member is angle-adjusted.

3. The multi-function stretching apparatus of claim 2, wherein
- the first stretching member is provided on the body frame to slide along the first movement path between a foremost position and a rearmost position, and
- the second stretching member is at a same height as the first stretching member and arranged on a front side of the foremost position of the first stretching member.

4. The multi-function stretching apparatus of claim 1, wherein
- the first stretching member includes a 1st-1 stretching member provided on the body frame to be slidable in the longitudinal direction and a 1st-2 stretching member that is arranged above the 1st-1 stretching member to be separated from the 1st-1 stretching member and is slidable in the longitudinal direction, and
- the second stretching member is at a same height as the 1st-1 stretching member and is arranged on a front side of the 1st-1 stretching member.

5. The multi-function stretching apparatus of claim 4, wherein the body frame includes:
- a plurality of support frames including a pair of first support frames having a first height and a pair of second support frames having a second height greater than the first height and arranged at rear of the pair of first support frames to be separated from the pair of first support frames; and
- a plurality of horizontal frames arranged between one of the pair of first support frames and one of the pair of second support frames and each having both end portions supported by one of the pair of first support frames and one of the pair of second support frames.

6. The multi-function stretching apparatus of claim 5, wherein the plurality of horizontal frames include:
- a pair of first horizontal frames extending in the longitudinal direction; and
- a pair of second horizontal frames extending in the longitudinal direction and arranged above the pair of first horizontal frames to be separated from the pair of first horizontal frames.

7. The multi-function stretching apparatus of claim 6, wherein a movement distance of the 1st-1 stretching member in the longitudinal direction is less than a length of each of the pair of first horizontal frames.

8. The multi-function stretching apparatus of claim 6, wherein the body frame further includes a plurality of connection frames configured to maintain an interval between the plurality of horizontal frames or the plurality of support frames.

9. The multi-function stretching apparatus of claim 8, wherein the plurality of connection frames include:

a first connection frame between the pair of first horizontal frames; and a second connection frame between the pair of second support frames.

10. The multi-function stretching apparatus of claim 9, wherein the second stretching member is arranged on the body frame to rotate about a preset rotation axis, and the first connection frame is arranged on a same axis as the preset rotation axis of the second stretching member.

11. The multi-function stretching apparatus of claim 1, wherein a first movement path when the first stretching member is moved in the longitudinal direction is separated from a third movement path when the third stretching member is height-adjusted.

12. The multi-function stretching apparatus of claim 11, wherein the first stretching member is arranged on the body frame to slide along the first movement path between a foremost position and a rearmost position, and the third stretching member is above the first stretching member to be separated from the first stretching member and to overlap the first stretching member in a vertical direction when the first stretching member is in the rearmost position.

* * * * *